(12) United States Patent
Kask

(10) Patent No.: US 8,942,459 B2
(45) Date of Patent: Jan. 27, 2015

(54) METHODS AND APPARATUS FOR FAST IDENTIFICATION OF RELEVANT FEATURES FOR CLASSIFICATION OR REGRESSION

(75) Inventor: Peet Kask, Harju maakond (EE)

(73) Assignee: PerkinElmer Cellular Technologies Germany GmbH, Tallinn (EE)

( * ) Notice: Subject to any disclaimer, the term of this patent is extended or adjusted under 35 U.S.C. 154(b) by 565 days.

(21) Appl. No.: 13/230,377

(22) Filed: Sep. 12, 2011

(65) Prior Publication Data

US 2013/0064441 A1    Mar. 14, 2013

(51) Int. Cl.
*G06K 9/00* (2006.01)
*G06K 9/62* (2006.01)

(52) U.S. Cl.
CPC .......... *G06K 9/00147* (2013.01); *G06K 9/623* (2013.01)
USPC .......................................... 382/133; 382/228

(58) Field of Classification Search
USPC .................. 382/128, 133, 190, 224, 225, 228
See application file for complete search history.

(56) References Cited

U.S. PATENT DOCUMENTS

| 4,097,845 | A | 6/1978 | Bacus | 340/146.3 CA |
|---|---|---|---|---|
| 4,183,013 | A | 1/1980 | Agrawala et al. | 340/146.3 AC |
| 5,933,519 | A | 8/1999 | Lee et al. | 382/133 |
| 8,600,144 | B2 | 12/2013 | Kask | 382/133 |
| 2001/0041347 | A1 | 11/2001 | Sammak et al. | 435/7.23 |
| 2006/0110048 | A1 | 5/2006 | Charlin et al. | 382/224 |
| 2006/0127881 | A1 | 6/2006 | Wong et al. | 435/4 |
| 2007/0206864 | A1 | 9/2007 | Charlin et al. | 382/224 |
| 2008/0166035 | A1 | 7/2008 | Qian et al. | 382/133 |
| 2008/0176276 | A1 | 7/2008 | Arai | 435/40.5 |
| 2010/0111397 | A1 | 5/2010 | Garud et al. | 382/133 |
| 2010/0150423 | A1 | 6/2010 | Hong et al. | 382/133 |
| 2013/0064441 | A1 | 3/2013 | Kask | 382/133 |
| 2013/0064468 | A1 | 3/2013 | Kask et al. | 382/257 |

FOREIGN PATENT DOCUMENTS

| EP | 2012254 A1 | 1/2009 | G06K 9/00 |
|---|---|---|---|
| WO | WO-2013/038224 A1 | 3/2013 | G06K 9/00 |
| WO | WO-2013/038225 A1 | 3/2013 | G06T 5/30 |

(Continued)

OTHER PUBLICATIONS

Beare, Richard, Morphology with Parabolic Structuring Elements, Dec. 16, 2008, 6 pages, Department of Medicine, Monash University, Melbourne Australia, URL:http:/fweb.archive.orgjweb/20101007114622/http://www.insight-journal.orgjbrowse/publication/228.

(Continued)

*Primary Examiner* — Andrew W Johns
(74) *Attorney, Agent, or Firm* — Choate, Hall & Stewart LLP

(57) ABSTRACT

In various embodiments, methods and apparatus are provided for automated selection of features of cells useful for classifying cell phenotype. The methods include determining a signal-to-noise ratio (S/N) for each of a plurality of pairs of features, rather than S/N for individual features. The approach is capable of quickly identifying a small set of features of imaged cells that are most relevant for classification of a desired cell phenotype from among a very large number of features. The small group of relevant features can then be used to more efficiently and more accurately classify phenotype of unidentified cells.

33 Claims, 13 Drawing Sheets
(2 of 13 Drawing Sheet(s) Filed in Color)

(56) References Cited

FOREIGN PATENT DOCUMENTS

| WO | WO-2013/068780 A1 | 5/2013 | ............... G06K 9/00 |
| WO | WO-2013/068781 A1 | 5/2013 | ............... G06K 9/00 |

OTHER PUBLICATIONS

Beare, Richard: itkParabolicUtils_h, Oct. 7, 2010, Department of Medicine, Monash University, Melbourne, Australia, 4 pages.

Chen, Xiang et al., Automated Interpretation of Subcellular Patterns in Fluorescence Microscope Images for Location Proteomics, International Society for Analytical Cytology, Cytometry Part A 69A: 631-640 (2006) 10 pages.

Cosio, F.A. et al., Automatic Analysis of Immunocytochemically Stained Tissue Samples, Medical and Biological Engineering and Computing, vol. 43, 2005, 6 pages.

Ersoy, Ilker et al., Multi-Feature Contour Evolution for Automatic Live Cell Segmentation in Time Lapse Imagery, 30th Annual International IEEE EMBS Conference, Aug. 20, 2008, 4 pages.

Ferreira, Tiago A. et al., The ImageJ User Guide—Version 1.43, hhtp://rsbweb.nih.gov/ij/docs/user-guide.pdf, Apr. 20, 2010, 189 pages.

Hamilton, Nicholas A. et al., Fast Automated Cell Phenotype Image Classification, BMC Bioinformatics, Mar. 30, 2007, 8 pages.

Held, Michael et al., CellCognition: Time-Resolved Phenotype Annotation in High-Throughput Live Cell Imaging, Nature Methods, vol. 7, No. 9, Sep. 2010, 10 pages.

Hiremath, P.S. et al., Automatic Classification of Bacterial Cells in Digital Microscopic Images, International Journal of Engineering and Technology, vol. 2, No. 4, Dec. 2009, 7 pages.

ImageJ's Subtract Background Code, Jan. 10, 2008, 89 pages, retrieved from internet: http://imageja.git.sourceforge.net/git/gitweb.cgi?p=imageja%2Fimageja;a=commitdiff_plain;h=73ae9a1fc4b1d09e4f0b60f5377ddc609aee7bff.

International Search Report for PCT/IB2011/002757, May 18, 2012, 4 pages.

International Search Report for PCT/IB2011/002969, mailed Mar. 16, 2012, 4 pages.

International Search Report for PCT/IB2011/002971, mailed May 5, 2012, 5 pages.

Knowles, D.W., Automated Local Bright Feature Image Analysis of Nuclear Protein Distribution Identifies Changes in Tissue Phenotype. Proceedings of the National Academy of Sciences, vol. 103, No. 12, Jan. 1, 2006, 6 pages.

Kojima S. et al., One-Dimensional Processing Architecture for Gray-Scale Morphology, Systems & Computer in Japan, vol. 27, No. 12, Nov. 15, 1996, 8 pages.

Lin et al., Automated 3-D Quantification of Brain Tissue at the Cellular Scale from Multi-Parameter Confocal Microscopy Images, IEEE, Apr. 1, 2007, 4 pages.

Lindblad, Joakim et al., Image Analysis for Automatic Segmentation of Cytoplasms and Classification of Rac1 Activation, Cytometry, vol. 57A, No. 1, Jan. 1, 2004, 12 pages.

Ljosa, Vebjorn et al., Introduction to the Quantitative Analysis of Two-Dimensional Fluorescence Microscopy Images for Cell-Based Screening, PloS Computational Biology, vol. 5, Issue 12, Dec. 2009, 10 pages.

Loo, Lit-Hsin et al. Image-Based Multivariate Profiling of Drug Responses from Single Cells, Nature Methods, vol. 4, No. 5, May, 2007, pp. 445-453, 9 pages.

Mircic, S. et al., Application of Neural Network for Automatic Classification of Leukocytes, Neural Network Applications in Electrical Engineering, IEEE, Sep. 1, 2006, 4 pages.

Nilufar S. et al., Automatic Blood Cell Classification based on Joint Histogram Based Feature and Bhattacharya Kernel, Signals, Systems and Computers, IEEE, Oct. 26, 2008, 4 pages.

Ramoser, H. et al., Leukocyte Segmentation and Classification in Blood-Smear Images, Proceedings of the 2005 IEEE Engineering in Medicine and Biology 27th Annual Conference, Sep. 1, 2005, 4 pages.

Serra, Jean, Image Analysis and Mathematical Morphology, Academical Press, 1984, 2 pages.

Sternberg, Stanley R., Biomedical Image Processing, Computer, IEEE Service Center, Los Alamitos, CA, US, vol. 40, No. 1.

Van Dem Boomgaard, R. et al., Quadratic Structuring Functions in Mathematical Morphology, Mathematical Morphology and Its Applications to Image and Signal Processing, Kluwer Academic Publishing, May 1, 1996, 8 pages.

Wang, Jun et al., Cellular Phenotype Recognition for High-Content RNA Interference Genome-Wide Screening, J. Biomol Screen 2008 13:29, 12 pages.

Wang, M., Feature Extraction, Selection and Classifier Design in Automated Time-Lapse Fluorescence Microscope Image Analysis, Microscopy: Science, Technology, Applications and Education, Jan. 1, 2010, 11 pages.

Wilkinson, M.H.F. et al., Digital Image Analysis of Microbes, John Wiley and Sons, 1998, 1 page.

Witten Opinion for PCT/IB2011/002969, mailed Mar. 16, 2012, 10 pages.

Written Opinion for PCT/IB2011/002757, May 18, 2012, 7 pages.

Written Opinion for PCT/IB2011/002971, mailed May 4, 2012, 6 pages.

Wu, Q. et al., Microscope Image Processing, Academic Press, 2008, 3 pages.

Al-Kofahi et al, Improved Automatic Detection and Segmentation of Cell Nuclei in Histopathology Images, IEEE Transactions on Biomedical Engineering, vol. 57, No. 4, Apr. 2010, pp. 841-852, (12 pages).

Beare, itkMorphologicaiSignedDistanceTransformImageFilter.h, 2008, The Insight Journal Jan.-Jun. 2008, p. 1-4, (7 pages).

Beare, itkParabolicErodeDilateImageFilter.h, 2008, The Insight Journal Jan.-Jun. 2008, p. 1-5, (8 pages).

Beare, itkParabolicErodeImageFilter.h, 2008, The Insight Journal Jan.-Jun. 2008, p. 1-2, (5 pages).

Beare, perfDT.cxx, 2008, The Insight Journal Jan.-Jun. 2008, p. 1-3, (6 pages).

Jun et al., Cellimage Processing Based on Distance Transform and Regional Growth, Fifth International Conference on Internet Computing for Science and Engineering, Nov. 1, 2010, pp. 6-9, (5 pages).

Opening (morphology), Apr. 2, 2010, Wikipedia.org, p. 1-2, (2 pages).

Tscherepanow et al., Automatic Segmentation of Unstained Living Cells in Bright-Field Microscope Images, 2008, Advances in Mass Data Analysis of Images and Signals in Medicine, Biotechnology, Chemistry and Food Industry Lecture Notes in Computer Science, vol. 5108, p. 158-172.

Waltz, Binary Dilation Using SKIPSM: Some Interesting Variations, Sep. 18, 1997, Proc. SPIE 3205, Machine Vision Applications, Architectures, and Systems Integration VI, p. 117-124.

Wu et al., Identifying Immature Precursor Cells in Bone Marrow Pathological Images Based on Distance Transform and Internal Structures of Cells. International Conference on Multimedia Technology, Oct. 29, 2010, p. 1-4, (5 pages).

International Search Report for PCT/IB2011/002726, 3 pages (Jun. 5, 2012).

Written Opinion for PCT/IB2011/002726, 8 pages (Jun. 5, 2012).

Kittler, J., Feature Set Search Algorithms, NATO ASI Series: Series E, Applied Science, 41-60 (1978).

Pekalska, E. et al., Pairwise Selection of Features and Prototypes, Advances in Soft Computing, 1-8 (2005).

Walker, R.F. et al., Classification of Cervical Cell Nuclei Using Morphological Segmentation and Textural Feature Extraction, IEEE, 297-301 (1994).

Webb, A.R., Feature Selection and Extraction, Statistical Pattern Recognition, 307-318 (2002).

METHODS AND APPARATUS FOR FAST IDENTIFICATION OF RELEVANT FEATURES FOR CLASSIFICATION OR REGRESSION

TECHNICAL FIELD

In various embodiments, the present invention relates to methods and apparatus for image analysis. More specifically, described herein are methods, and apparatus for fast identification of relevant features of objects depicted in an image for classification or regression.

BACKGROUND

The ability to automatically classify objects into categories of interest has applications across a wide range of industries and scientific fields, including biology, social sciences, and finance. One particular application of interest is the classification of biological cells according to cell phenotype. Due to the large number of features (i.e., numeric properties) that typically must be calculated and considered in such classification, this process can be difficult, computationally intensive, and time-consuming.

For example, in the classification of cell phenotypes, typically hundreds of texture and morphology features of cells depicted in images are calculated and used for automated cell classification. First, training is performed whereby imaged cells are identified by a user as belonging to one of two or more categories. Many texture and morphology features are computed for each of these identified cells, and the system determines algorithms for distinguishing between the categories on the basis of these features. Then images containing cells of unidentified type can be analyzed to automatically determine cell type, based on those algorithms.

To improve the speed of this classification process, it is desirable to narrow down the number of texture and morphology features used for classification to something more manageable. Identification of a small subset of those features that are most effective for distinguishing a particular cell phenotype of interest is a complex problem. Unfortunately, there is no universally accepted, safe, and fast way to select a few relevant features and omit the features that in fact do not contribute to classification of cell phenotype.

Selection of a few relevant features out of hundreds of initially calculated features is a scientific problem that has several approaches but no commonly-accepted solution. For example, some features may be useful or relevant for classification only when considered in combination with one or more other features. As a further complication, the number of possible combinations of features is extremely high and trying them all is not practical. Current approaches of the classification of cell phenotype, such as Artificial Neuron Networks, utilize methods that are time-inefficient and non-transparent.

Thus, improved systems and methods are needed for fast identification of relevant features of objects depicted in images for classification or regression.

SUMMARY OF THE INVENTION

A computationally elegant approach is presented herein for the automated selection of features of cells useful for classifying cell phenotype. The approach allows many parallel operations to be executed at the same time, thereby improving calculation speed. Compared with previous approaches, the approach described herein is capable of very fast training and classification. The approach is capable of quickly identifying a small set of features of imaged cells that are most relevant for classification of a desired cell phenotype from among a very large number of features. The small group of relevant features can then be used to more efficiently and more accurately classify phenotype of unidentified cells. Since the number of relevant features may be low, the approach is relatively transparent, particularly compared to existing approaches, such as Artificial Neuron Networks, which can be slow black boxes.

In one aspect, the invention is directed to an apparatus for automated selection of features of cells useful for classifying cell phenotype, said features extracted from one or more images of the cells, the apparatus including: (a) a memory for storing a code defining a set of instructions; and (b) a processor for executing the set of instructions, wherein the code includes an automated feature selection module to identify a set $S_2$ of $N_2$ calculated features for classification of cell phenotype, wherein the automated image feature selection module is configured to: (i) determine a signal-to-noise ratio for each of a plurality of pairs of features from an original set $S_0$ of $N_0$ calculated features of cells in one or more images, wherein the signal-to-noise ratio of a given pair of features reflects an ability to use that pair of features to classify cell phenotype, and identify a predetermined number $N_P$ of feature pairs from the original set $S_0$ of $N_0$ calculated features, said $N_P$ pairs having the highest signal-to-noise ratio, wherein $N_P$ is an integer $\geq 2$; and (ii) identify the set $S_2$ of $N_2$ calculated features for classification of cell phenotype from among the members of the $N_P$ pairs of calculated features.

In certain embodiments, $N_0$ is an integer from about 100 to about 1000; $N_2$ is an integer no greater than about 10; and/or $N_2$ is an integer from 2 to 6.

In certain embodiments, the automated image feature selection module is configured to identify, in step (ii), a set $S_1$ of all features from which the set $S_2$ of $N_2$ features for classification of cell phenotype is selected, wherein the set $S_1$ contains all distinct (non-redundant) members of the $N_P$ feature pairs except pairs that contain a given feature that has appeared in more than a predetermined number $N_s$ of pairs with higher signal-to-noise ratio. In certain embodiments, $N_P$ is an integer between 10 and 30, and $N_s$ is an integer between 2 and 6.

In certain embodiments, the automated image feature selection module is further configured to: (iii) populate candidate set $S_2'$ with the feature pair having the highest signal-to-noise ratio from among the $N_P$ feature pairs, then proceed to step (iv); (iv) for each candidate feature remaining in set $S_1$, that is not already in set $S_2'$, determine a signal-to-noise ratio for the set of all members of set $S_2'$ together with the candidate feature of set $S_1$, determine which one of these candidate features of set $S_1$ provides the highest signal-to-noise ratio when grouped with the members of set $S_2'$, accept this candidate feature of set $S_1$ into set $S_2'$ and repeat step (iv) with the updated set $S_2'$ where addition of the candidate feature of set $S_1$ into set $S_2'$ increases signal-to-noise ratio by at least a first threshold amount, and reject addition of the candidate feature of set $S_1$ into set $S_2'$ and proceed to step (v) if addition of the candidate feature of set $S_1$ into set $S_2'$ does not increase signal-to-noise ratio of set $S_2'$ by at least the first threshold amount; (v) for each possible pair of candidate features remaining in set $S_1$ that are not already in set $S_2'$, determine a signal-to-noise ratio for the set of all members of set $S_2'$ together with the pair of candidate features from set $S_1$, determine which one of these pairs of candidate features of set $S_1$ provides the highest signal-to-noise ratio when grouped with the members of set $S_2'$, accept this pair of candidate features of set $S_1$ into set $S_2'$ and repeat step (iv) with the updated set $S_2'$ where addition of the pair of candidate features of set $S_1$ into set $S_2'$ increases signal-to-noise ratio by at least a second threshold amount, and reject addition of the pair of candidate features of set $S_1$ into set $S_2'$ and proceed to step (vi) if addition of the candidate pair of features of set $S_1$ into set $S_2'$ does not increase signal-to-noise ratio by at least the second threshold amount; and (vi) for each given member of set $S_2'$, determine a signal-to-noise ratio for the set of all the members of set $S_2'$ except the given member, determine which one of the given members results in the highest signal-to-noise ratio of the set $S_2'$ with the given member removed from set $S_2'$, remove this given member from set $S_2'$ and repeat step (iv) with the updated set $S_2'$ where removal of this given member from set $S_2'$ increases signal-to-noise ratio of set $S_2'$ by at least a third threshold amount, and retain this given member in set $S_2'$ and accept members of candidate set $S_2'$ into set $S_2$ where removal of this given member from set $S_2'$ does not increase signal-to-noise ratio of set $S_2'$ by at least the third threshold amount. In certain embodiments, the magnitude of the third threshold amount is the same as the magnitude of the first threshold amount, and the magnitude of the second threshold amount is twice the magnitude of the first threshold amount.

In certain embodiments, the code further includes an automated classification module configured to classify cell phenotype of one or more selected cells, wherein the automated classification module is configured to: (vii) for each of the one or more selected cells, quantify each member of the set $S_2$ of image features; and (viii) for each of the one or more selected cells, identify a cell phenotype for that cell based on the values of the $S_2$ image features for that cell, quantified in step (vii). In certain embodiments, the automated classification module is configured to, for each of the one or more selected cells, identify the cell phenotype for that cell, wherein the cell phenotype is one class selected from two possible classes. In certain embodiments, the automated classification module is configured to, for each of the one or more selected cells, identify the cell phenotype for that cell, wherein the cell phenotype is one class selected from three or more possible classes.

In certain embodiments, the features of cells for which signal-to-noise ratios are determined in step (i) by the automated image feature selection module include texture features, morphology features, intensity features, or any combination thereof. For example, the features of cells for which signal-to-noise ratios are determined in step (i) by the automated image feature selection module may include one or more morphological features, geometrical features, Zernike moment features, Haralick texture features, edge features, wavelet features, region properties, cellular adjacency features, clustering features, phenotype shape descriptors, kinetic measurements, and/or subcellular location features (e.g., distance from an organelle to a nucleus).

In certain embodiments, the automated image feature selection module is configured to determine a signal-to-noise ratio for each possible pairwise combination of features among the $N_0$ calculated features. For example, in certain embodiments, the automated image feature selection module is configured to directly calculate in step (i) an $N_0 \times N_0$ matrix of linear coefficients, W, for maximizing an objective function, wherein the elements $W_{i,j}$ of matrix W are measures of signal-to-noise ratio for corresponding feature pairs (i,j) and are calculated using an analytical solution for inversion of a 2×2 symmetric matrix. The objective function may be, for example, a ratio of variance between two classes to variance within the two classes.

In certain embodiments, the one or more images are 2D images. In certain embodiments, the one or more images are 3D images.

In another aspect, the invention is directed to a method for automated selection of image features useful for classifying cell phenotype, the method including the steps of: (a) quantifying each of a plurality of features for a first set of imaged cells obtained from a subject and having a first known class; (b) quantifying each of the plurality of features for a second set of imaged cells obtained from a subject and having a second known class different from the first known class; (c) using values of the features quantified in steps (a) and (b) for the first and second sets of imaged cells, determining for each of a plurality of selected pairs of features a signal-to-noise ratio for discrimination between the first and second classes on the basis of the selected pair of features; (d) identifying a predetermined number $N_P$ of feature pairs with highest signal-to-noise ratio determined in step (c) wherein $N_P$ is an integer $\geq 2$; and (e) identifying a set $S_1$ of all features within the $N_P$ feature pairs identified in step (d) from which the set $S_2$ of image features for classification of cell phenotype of an unknown sample is selected. In certain embodiments, step (e) includes selecting set $S_2$ by: (i) populating candidate set $S_2'$ with the feature pair having the highest signal-to-noise ratio from among the $N_P$ feature pairs, then proceeding to step (ii); (ii) for each candidate feature remaining in set $S_1$, that is not already in set $S_2'$, determining a signal-to-noise ratio for the set of all members of set $S_2'$ together with the candidate feature of set $S_1$, determining which one of these candidate features of set $S_1$ provides the highest signal-to-noise ratio when grouped with the members of set $S_2'$, accept this candidate feature of set $S_1$ into set $S_2'$ and repeating step (ii) with the updated set $S_2'$ where addition of the candidate feature of set $S_1$ into set $S_2'$ increases signal-to-noise ratio by at least a first threshold amount, and rejecting addition of the candidate feature of set $S_1$ into set $S_2'$ and proceeding to step (iii) if addition of the candidate feature of set $S_1$ into set $S_2'$ does not increase signal-to-noise ratio of set $S_2'$ by at least the first threshold amount; (iii) for each possible pair of candidate features remaining in set $S_1$ that are not already in set $S_2'$, determining a signal-to-noise ratio for the set of all members of set $S_2'$ together with the pair of candidate features from set $S_1$, determining which one of these pairs of candidate features of set $S_1$ provides the highest signal-to-noise ratio when grouped with the members of set $S_2'$, accepting this pair of candidate features of set $S_1$ into set $S_2'$ and repeating step (ii) with the updated set $S_2'$ where addition of the pair of candidate features of set $S_1$ into set $S_2'$ increases signal-to-noise ratio by at least a second threshold amount, and rejecting addition of the pair of candidate features of set $S_1$ into set $S_2'$ and proceeding to step (iv) if addition of the candidate pair of features of set $S_1$ into set $S_2'$ does not increase signal-to-noise ratio by at least the second threshold amount; and (iv) for each given member of set $S_2'$, determining a signal-to-noise ratio for the set of all the members of set $S_2'$ except the given member, determining which one of the given members results in the highest signal-to-noise ratio of the set $S_2'$ with the given member removed from set $S_2'$, removing this given member from set $S_2'$ and repeating step (ii) with the updated set $S_2'$ where removal of this given member from set $S_2'$ increases signal-to-noise ratio of set $S_2'$ by at least a third threshold amount, and retaining this given member in set $S_2'$ and accepting members of candidate set $S_2'$ into set $S_2$ where removal of this given member from set $S_2'$ does not increase signal-to-noise ratio of set $S_2'$ by at least the third threshold amount. In certain embodiments, the magnitude of the third threshold amount is the same as the magnitude of the first threshold amount, and the magnitude of the second threshold amount is twice the magnitude of the first threshold amount.

In certain embodiments, $N_0$ is an integer from about 100 to about 1000; $N_2$ is an integer no greater than about 10; $N_2$ is an integer from 2 to 6; and/or $N_p$ is an integer between 10 and 30.

In certain embodiments, the set $S_1$ contains all distinct (non-redundant) members of the $N_p$ feature pairs except pairs that contain a given feature that has appeared in more than a predetermined number $N_s$ of pairs with higher signal-to-noise ratio. For example, $N_s$ is an integer between 2 and 6.

In certain embodiments, the method includes the step of classifying cell phenotype of one or more selected cells by: (I) for each of the one or more selected cells, quantifying each member of the set $S_2$ of image features; and (II) for each of the one or more selected cells, identifying a cell phenotype for that cell based on the values of the $S_2$ image features for that cell. In certain embodiments, the method includes, for each of the one or more selected cells, identifying the cell phenotype for that cell, wherein the cell phenotype is one class selected from two possible classes. In certain embodiments, the method includes, for each of the one or more selected cells, identifying the cell phenotype for that cell, wherein the cell phenotype is one class selected from three or more possible classes.

In certain embodiments, the features of cells for which signal-to-noise ratios are determined include texture features, morphology features, intensity features, or any combination thereof. For example, the features of cells may include one or more morphological features, geometrical features, Zernike moment features, Haralick texture features, edge features, wavelet features, region properties, cellular adjacency features, clustering features, phenotype shape descriptors, kinetic measurements, and/or subcellular location features (e.g., distance from an organelle to a nucleus).

In certain embodiments, the method includes determining a signal-to-noise ratio for each possible pairwise combination of features among the $N_0$ calculated features. For example, the method may include calculating an $N_0 \times N_0$ matrix of linear coefficients, W, for maximizing an objective function, wherein the elements $W_{i,j}$ (and $W_{j,i}$) of matrix W are measures of signal-to-noise ratio (e.g., linear coefficients) for corresponding feature pairs (i,j) and are calculated using an analytical solution for inversion of a 2×2 symmetric matrix (e.g., of the within-class covariance matrix for the feature pair). In certain embodiments, the objective function is a ratio of variance between two classes to variance within the two classes.

Elements of embodiments described with respect to a given aspect of the invention may be used in various embodiments of another aspect of the invention. For example, it is contemplated that features of dependent claims depending from one independent claim can be used in apparatus and/or methods of any of the other independent claims.

BRIEF DESCRIPTION OF THE DRAWINGS

The file of this patent contains at least one drawing executed in color. Copies of this patent with color drawing(s) will be provided by the Patent and Trademark Office upon request and payment of the necessary fee.

The foregoing and other objects, aspects, features, and advantages of the invention will become more apparent and may be better understood by referring to the following description taken in conjunction with the accompanying drawings, in which.

DESCRIPTION

Figure 1:
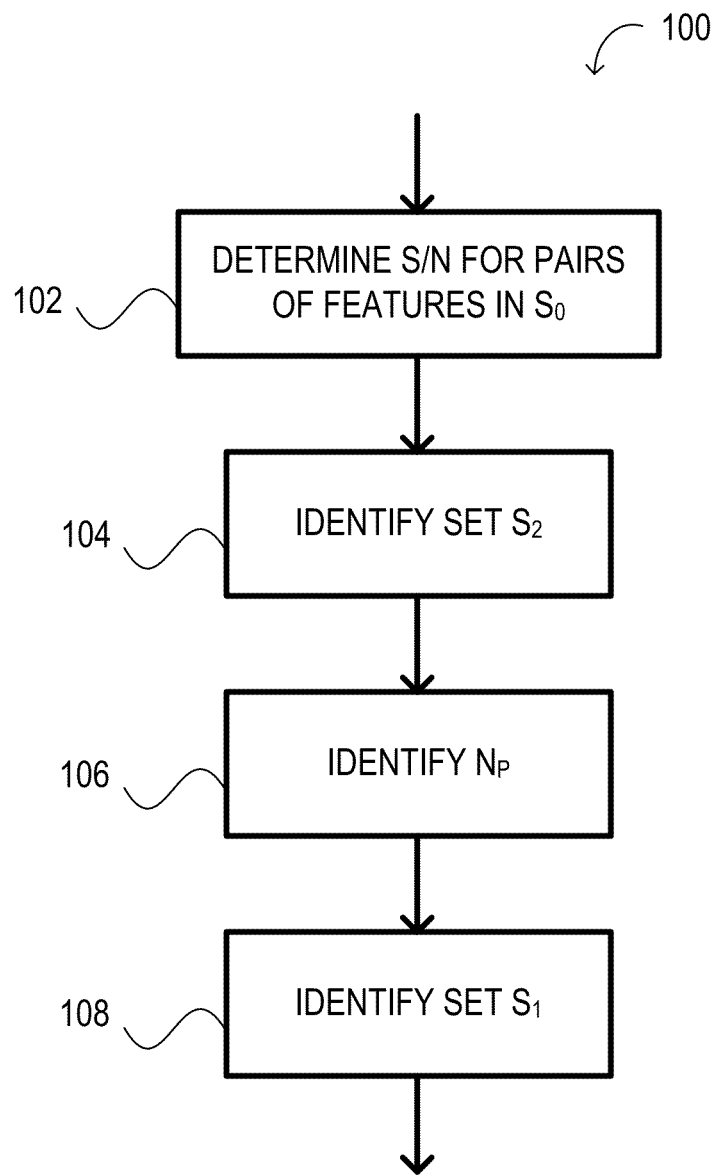
FIGS. 1 through 4 are flowcharts of a method for automated selection of features, according to an illustrative embodiment of the invention.

In certain embodiments, the systems, methods, and apparatus described herein perform feature selection for classification of objects by initially considering the ability of pairs of features determined from one or more images of the objects to distinguish between categories, rather than single features alone. In applications such as cell classification, considering pairs of features for distinguishing between two or more categories of cell phenotype is found to work more quickly and produce better results than considering features one-by-one. Accordingly, in one embodiment, the selection of a relevant set of features starts with selecting a number of best feature pairs.

The search for feature pairs may employ linear classification or regression, and the signal to noise ratio (S/N) may be used to measure quality of classification or regression. In one embodiment, an efficient algorithm is provided for maximizing S/N for all possible pairs of features in a single step. The approach handles hundreds of features in a very short calculation time, narrowing them down to a handful of salient features that are most useful for classification of cell phenotype.

In certain embodiments involving classification from among more than two categories, the multi-class problem is reduced to a number of two-class problems, thereby allowing the two-class problem approach described herein to be utilized.

According to the Fisher Linear Discriminant approach, the objective function to be maximized is the ratio of the variance between the classes $\sigma_b^2$ to the variance within the classes) $\sigma_w^2$ (i.e. $\sigma_b^2/\sigma_w^2$). In one embodiment, the square root of this ratio is S/N. In another embodiment, the result of finding an optimal linear combination, as described below, does not depend on whether the maximized function is S/N or its square. Variance between the two classes is $$\sigma_b^2 = (w \cdot (\mu_2 - \mu_1))^2 \quad (1)$$

Variance within the classes is $$\sigma_w^2 = w_T(\Sigma_1 + \Sigma_2)w. \quad (2)$$

In the preceding equations, the vector of linear coefficients has been denoted by w, $w_T$ is the transpose of w, $\Sigma$ stands for within-class covariance matrix, $\mu$ is a vector of mean values, and the subscripts 1 and 2 denote the two classes. Linear coefficients that maximize the objective function may be expressed as $$w=(\Sigma_1+\Sigma_2)^{-2}(\mu_2-\mu_1). \quad (3)$$

In one embodiment, the case of two features is of special interest, and the following analytic solution for a 2×2 symmetric matrix is utilized:

$$\begin{bmatrix} a & b \\ b & c \end{bmatrix}^{-1} = \frac{1}{ac-b^2}\begin{bmatrix} c & -b \\ -b & a \end{bmatrix}. \quad (4)$$

Specifically, this analytic solution is applied to the first factor on the right-hand side of equation (3).

Next, matrix algebra is applied to calculate the solution for each pair among a high number (N) of features. Instead of calculating a vector of two elements w for each pair of features separately, an N×N matrix of linear coefficients of pairs of features is directly calculated. This matrix is referred to as W, in which $W_{ij}$ and $W_{ji}$ are linear coefficients for the feature pair with the $i^{th}$ and $j^{th}$ features. In the end, although the same, numerically identical set of linear coefficients is calculated in both cases, computation times are shorter in the second case, due to the large number of parallel operations without overhead cost. For example, starting with a table of 187 features and calculating the W-matrix, followed by calculation of signal to noise ratio (S/N) for each feature pair, the computation time may be less than 0.1 seconds using a Dell Latitude 630 (2.2 GHz laptop). More specifically, in a case where the number of objects is large (e.g., about 230), the calculation time depends on this number of objects only weakly, because the number influences only the first (fast) step of calculations, when the mean vector and covariance matrix are calculated for each class. In one embodiment, S/N is the square root of $\sigma_b^2/\sigma_w^2$, where $\sigma_b^2$ and $\sigma_w^2$ are given by equations 1 and 2, respectively.

In certain embodiments, after having obtained a list of feature pairs in decreasing order of quality or S/N, as described above, attention is given to a rather short list of pre-selected features (e.g., around 20 features), which is compiled from a list of a limited number $N_P$ of best feature pairs. An input parameter of the pre-selection procedure is the number of times $N_S$ a single feature is allowed to appear, before all following pairs with the same feature are omitted.

In certain embodiments, $N_P$ (number of best feature pairs) and $N_S$ (number of times each feature is allowed to appear) are selected empirically. For example, with respect to cell classification, a high number of classification examples have been studied. This involved running the same set of examples several times using different values of $N_P$ and $N_S$. If $N_P$ (or $N_S$) is too small, then some relevant features may be omitted. On the other hand, if $N_P$ (or $N_S$) is too large, computation times may be excessive. It is found in certain embodiments involving classification of cell phenotype that $N_P$ is advantageously selected to be an integer from 10 to 30, and $N_S$ is advantageously selected to be an integer from 2 to 6.

Regarding the value of $N_S$, in some instances a single feature has an excellent S/N ratio by itself. In this situation, there is a danger that this single feature may bring too many weak partners into the list of preselected features. Therefore, the value of $N_S$ is preferably chosen to limit the number of appearances of a single feature, thereby avoiding the possibility of preselecting an excessive number of weak partners.

The next step in the classification or regression process is fine-selection of relevant features. In one embodiment, a set of relevant features is initialized with the best pair, and attempts are made to add one or more (e.g., two) features to the set. The feature or features are added if the improvement in S/N is significant (e.g., greater than four percent with the addition of a single feature, or greater than eight percent with the addition of two features). Likewise, in another embodiment, attempts are made to remove one feature, and the feature will be removed if the reduction in S/N is insignificant (e.g., less than four percent). As discussed in more detail below, these attempts to expand and contract the list of relevant features may be repeated until no changes in the list of relevant features occur. For reference, when the methods are used for cell phenotype classification, the number of relevant features determined this way is generally from two to six, although more features or fewer features may be determined.

In certain embodiments, when adding relevant features, it may be necessary to add two complementary features at a time to gain from the cooperation of the two features. When removing features, however, the features may be removed one at a time. In general, removing features one by one returns adequate results, even when there are pairs of features cooperating with each other.

Adding or removing a feature results in a corresponding increase or decrease in S/N. Different approaches may be used to determine whether the changes in S/N are significant. One such approach is an F-test. In this embodiment, the signal to noise ratio is calculated while considering the number of features. For example, each feature brings along an additional linear coefficient (i.e. an additional dimension of freedom). Alternatively, a simpler approach may be used. Specifically, the current hypothesis is rejected only if the alternative increases the S/N by more than a specified threshold factor. For example, good results have been obtained with a threshold factor of 1.05, which corresponds to a five percent increase in S/N. In other embodiments, the threshold factor is about 1.02, 1.04, 1.06, or 1.08.

As discussed in more detail below, in certain embodiments, the process of adding and/or removing partners to generate the list of features to be used for classification purposes begins with the best pair of features. Next, an attempt is made to add a partner. If this fails (e.g., the S/N does not increase by more than a threshold factor of, for example, 1.05), an attempt is made to add two partners at a time. With this attempt, the original threshold factor is squared (e.g., $1.05^2$). If this also fails, an attempt is made to remove a partner. When removing a partner is successful (e.g., if S/N is reduced by less than the factor 1.05), an attempt is again made to add a partner. This process of attempting to add or remove partners is stopped when all three kinds of attempts, described above, have failed. The process is unable to continue in a closed loop because, in each successive case, even though the same number of features may be repeated, S/N must have grown in such case.

FIGS. 1 through 5 are flowcharts depicting a method 100 for automated selection of features of cells useful for classifying cell phenotype, in accordance with certain embodiments of the present invention. The features may be extracted from one or more images (e.g., 2D or 3D images) of the cells. Referring to FIG. 1, the method 100 includes determining (step 102) S/N for each of a plurality of pairs of features from an original set $S_0$ of $N_0$ calculated features of cells in one or more images. The S/N of a given pair of features reflects an ability to use that pair of features to classify cell phenotype. The method 100 also includes identifying (step 104) the set $S_2$ of $N_2$ calculated features for classification of cell phenotype from among the $N_0$ calculated features using the S/N values. As depicted, the method 100 includes identifying (step 106) a predetermined number $N_P$ of feature pairs from the original set $S_0$ of $N_0$ calculated features. The $N_P$ pairs have the highest S/N determined in step 102. The method 100 also includes identifying (step 108) a set $S_1$ of all features from which the set $S_2$ of $N_2$ features for classification of cell phenotype is selected. The set $S_1$ contains all distinct (non-redundant) members of the $N_P$ feature pairs except pairs that contain a given feature that has appeared in more than a predetermined number $N_S$ of pairs with higher S/N.

In one embodiment, at step 102, the S/N for all pairs of features is calculated and the pairs are ordered by S/N value. Then, at step 104, from the list of pairs of features with decreasing S/N value, the first few rows are used for identifying the set $S_1$.

Figure 2:
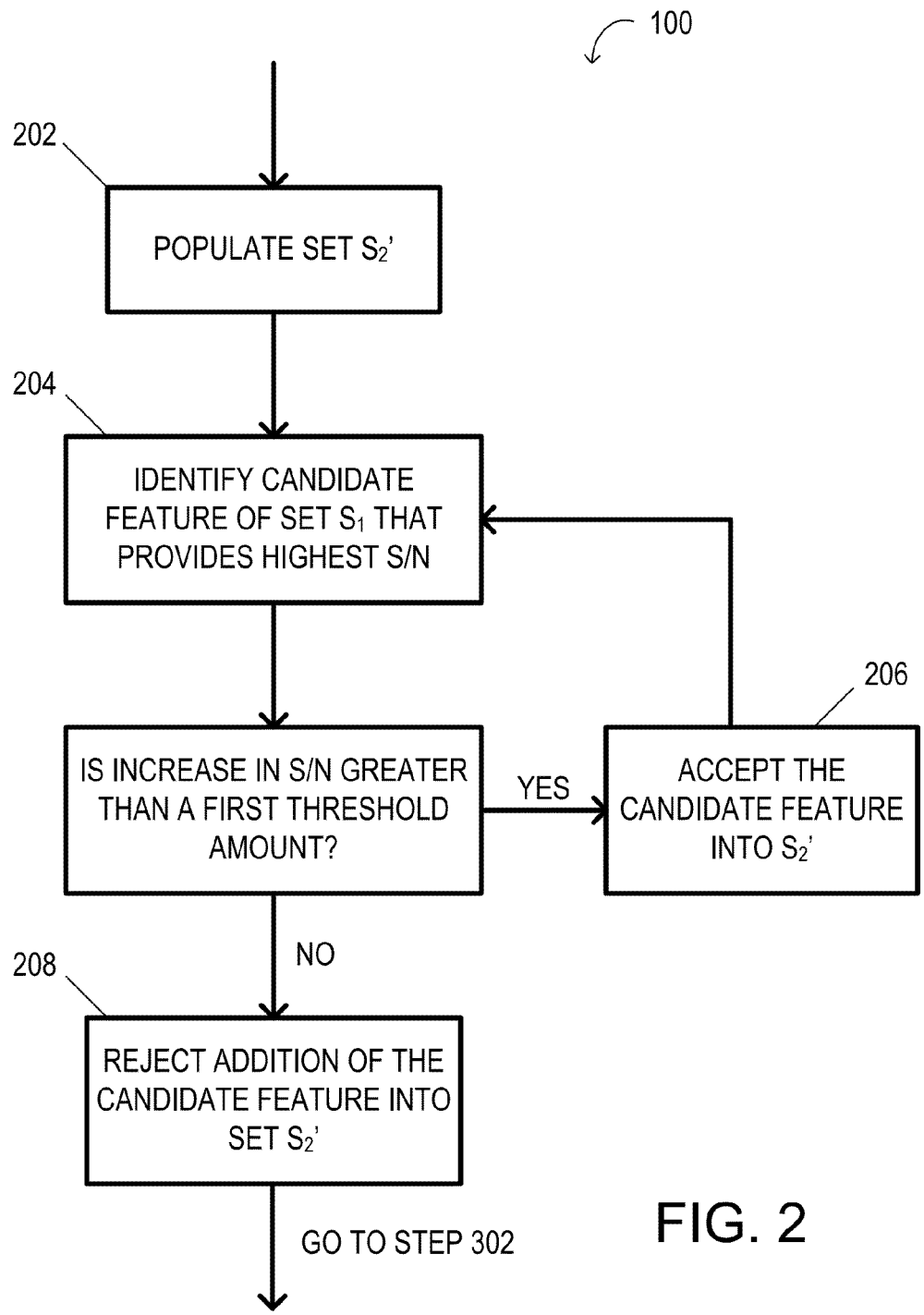

Referring to FIG. 2, in certain embodiments, the method 100 includes the step of populating (step 202) candidate set $S_2'$ with the feature pair having the highest S/N from among the $N_P$ feature pairs. For each candidate feature remaining in set $S_1$, that is not already in set $S_2'$, the method 100 includes determining a S/N for the set of all members of set $S_2'$ together with the candidate feature of set S. Next, the method 100 includes determining or identifying (step 204) which one of these candidate features of set $S_1$ provides the highest S/N when grouped with the members of set $S_2'$. This candidate feature is accepted (step 206) into set $S_2'$ if addition of the candidate feature into set $S_2'$ increases S/N by at least a first threshold amount. Step 204 is then repeated with the updated set $S_2'$. Alternatively, addition of the candidate feature into set $S_2'$ is rejected (step 208) if addition of the candidate feature of set $S_1$ into set $S_2'$ does not increase S/N of set $S_2'$ by at least the first threshold amount. In this case, the method 100 proceeds to step 302.

Figure 3:
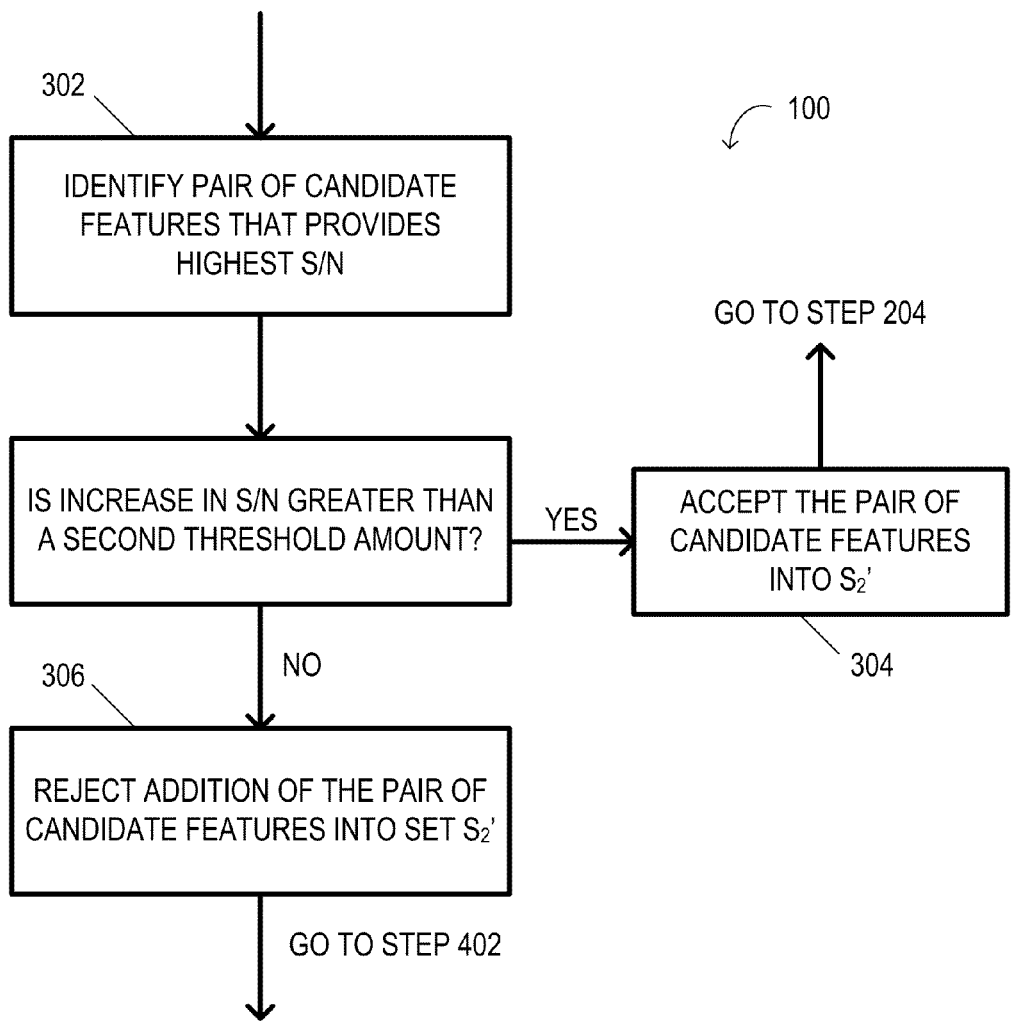

Referring to FIG. 3, in certain embodiments, for each possible pair of candidate features remaining in set $S_1$ that are not already in set $S_2'$, the method 100 includes determining a S/N for the set of all members of set $S_2'$ together with the pair of candidate features from set $S_1$. At step 302, the method 100 includes determining or identifying which one of these pairs of candidate features of set $S_1$ provides the highest S/N when grouped with the members of set $S_2'$. This pair of candidate features is accepted (step 304) into set $S_2'$, and step 204 is repeated with the updated set $S_2'$, if addition of the pair of candidate features into set $S_2'$ increases S/N by at least a second threshold amount. Alternatively, addition of the pair of candidate features into set $S_2'$ is rejected (step 306) if addition of the candidate pair of features into set $S_2'$ does not increase S/N by at least the second threshold amount. In this case, the method 100 proceeds to step 402.

Figure 4:
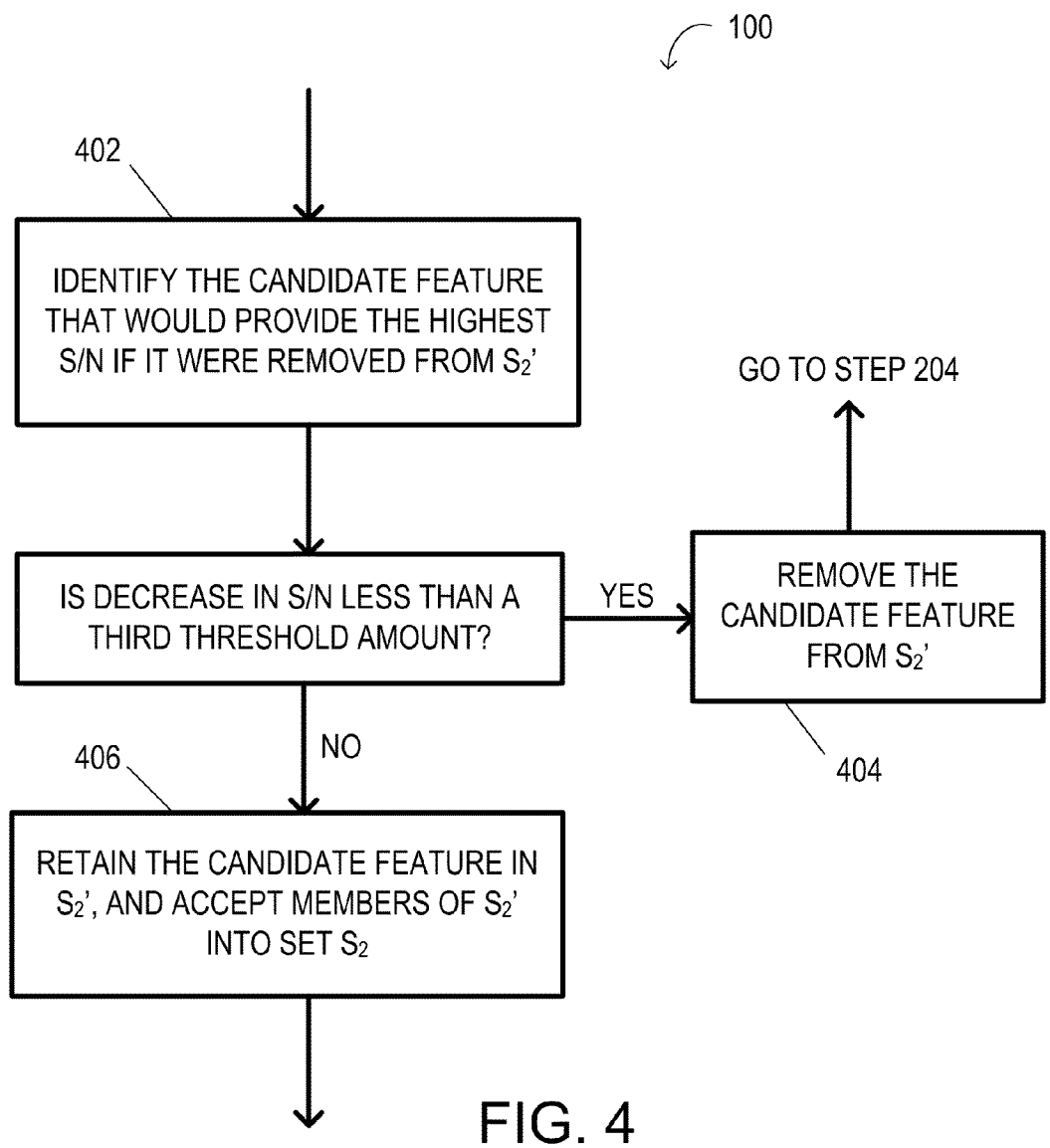

Referring to FIG. 4, in certain embodiments, for each given member of set $S_2'$, the method 100 includes determining a S/N for the set of all the members of set $S_2'$ except the given member. The method 100 also includes determining or identifying (step 402) which one of the given members results in the highest S/N of the set $S_2'$ with the given member removed from set $S_2'$. The given member is removed (step 404) from set $S_2'$, and step 204 is repeated with the updated set $S_2'$, if removal of this given member from set $S_2'$ reduces S/N of set $S_2'$ by less than a third threshold amount. Alternatively, the given member is retained (step 406) in set $S_2'$, and members of candidate set $S_2'$ are accepted into set $S_2$, if removal of the given member from set $S_2'$ does not reduce S/N of set $S_2'$ by less than the third threshold amount.

Figure 5:
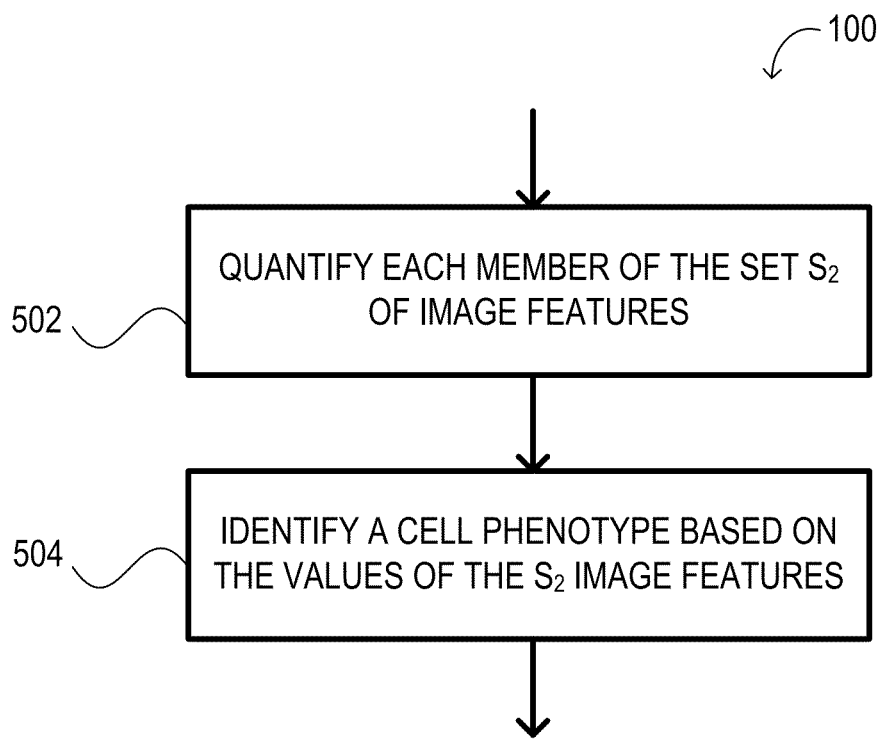
FIG. 5 is a flowchart of a method for classifying cell phenotype, according to an illustrative embodiment of the invention.

Referring to FIG. 5, in certain embodiments, the method 100 is used to classify cell phenotype of one or more selected cells. The method 100 includes the step of, for each of the one or more selected cells, quantifying (step 502) each member of the set $S_2$ of image features. For each of the one or more selected cells, the method 100 also includes identifying (step 504) a cell phenotype for that cell based on the values of the $S_2$ image features for that cell, quantified in step 502.

In certain embodiments, the method 100 includes the step of calculating, as part of step 102, an $N_0 \times N_0$ matrix of linear coefficients, W. The elements $W_{i,j}$ of matrix W are measures of S/N for corresponding feature pairs (i,j) and are calculated using an analytical solution for inversion of a 2×2 symmetric matrix. The objective function may be a ratio of variance between two classes to variance within the two classes. As mentioned, S/N may be the square root of this ratio.

In another embodiment, many objective functions are involved in the method 100. Specifically, while W is presented as a single $N_0 \times N_0$ matrix, it may represent a high number of two-element vectors ($w_{ij}$, $w_{ji}$), each of which corresponds to an objective function and the S/N of the given feature pair (i,j).

The method 100 may also include identifying the cell phenotype for a cell, wherein the cell phenotype is one class selected from two possible classes or three or more possible classes. In certain embodiments, the magnitude of the third threshold amount is the same as the magnitude of the first threshold amount, and the magnitude of the second threshold amount is twice the magnitude of the first threshold amount.

In certain embodiments, the methods described herein are implemented on a computer using software code that includes a set of instructions.

Figure 6:
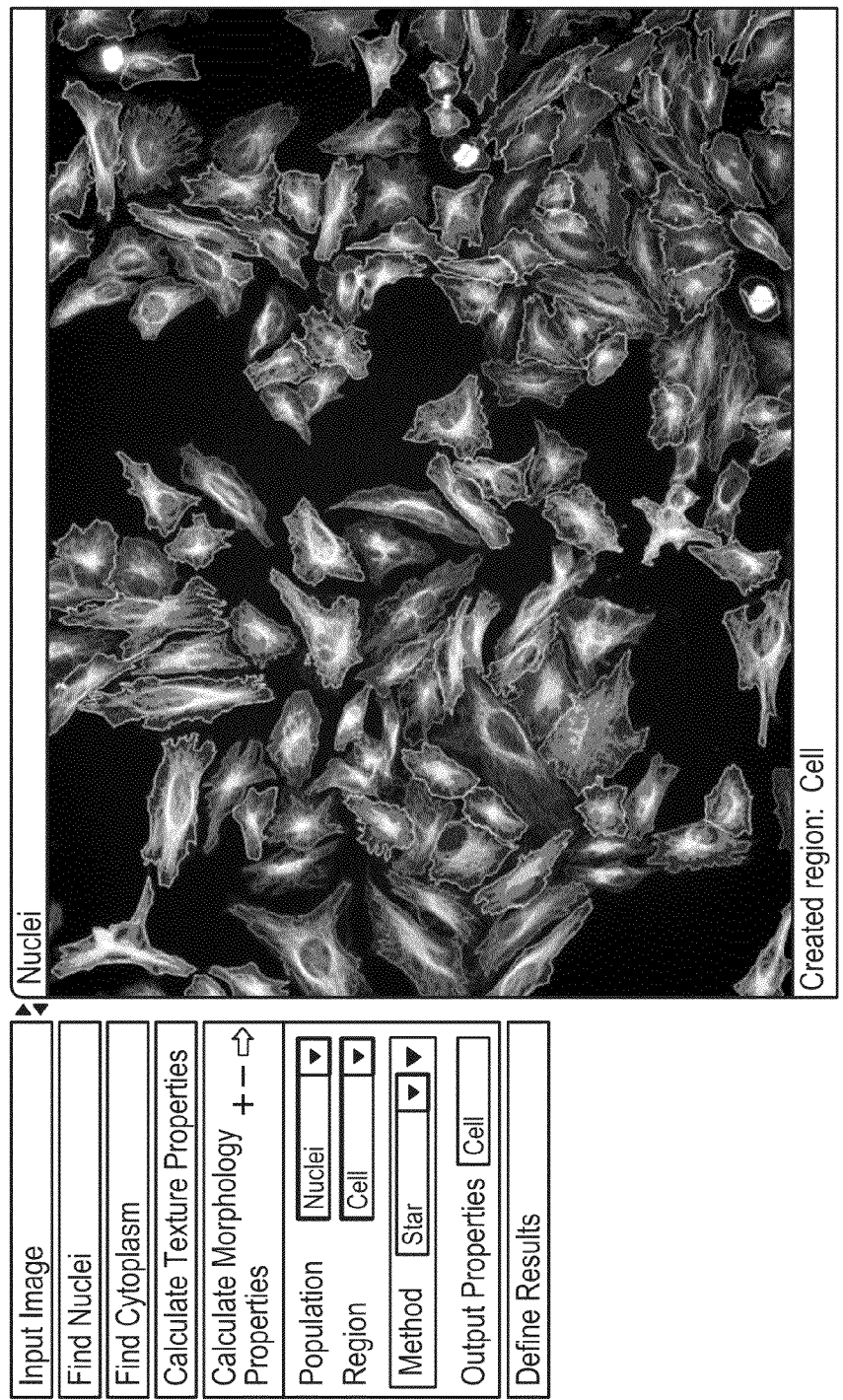
FIG. 6 is a screenshot of a sequence of building blocks for detecting cells and extracting a number of texture and morphology features, according to an illustrative embodiment of the invention.

Referring to the screenshot in FIG. 6, at a preliminary stage of the feature selection process, a sequence of building blocks is created for detecting cells and extracting a high number of intensity, texture and morphology features.

Figure 7:
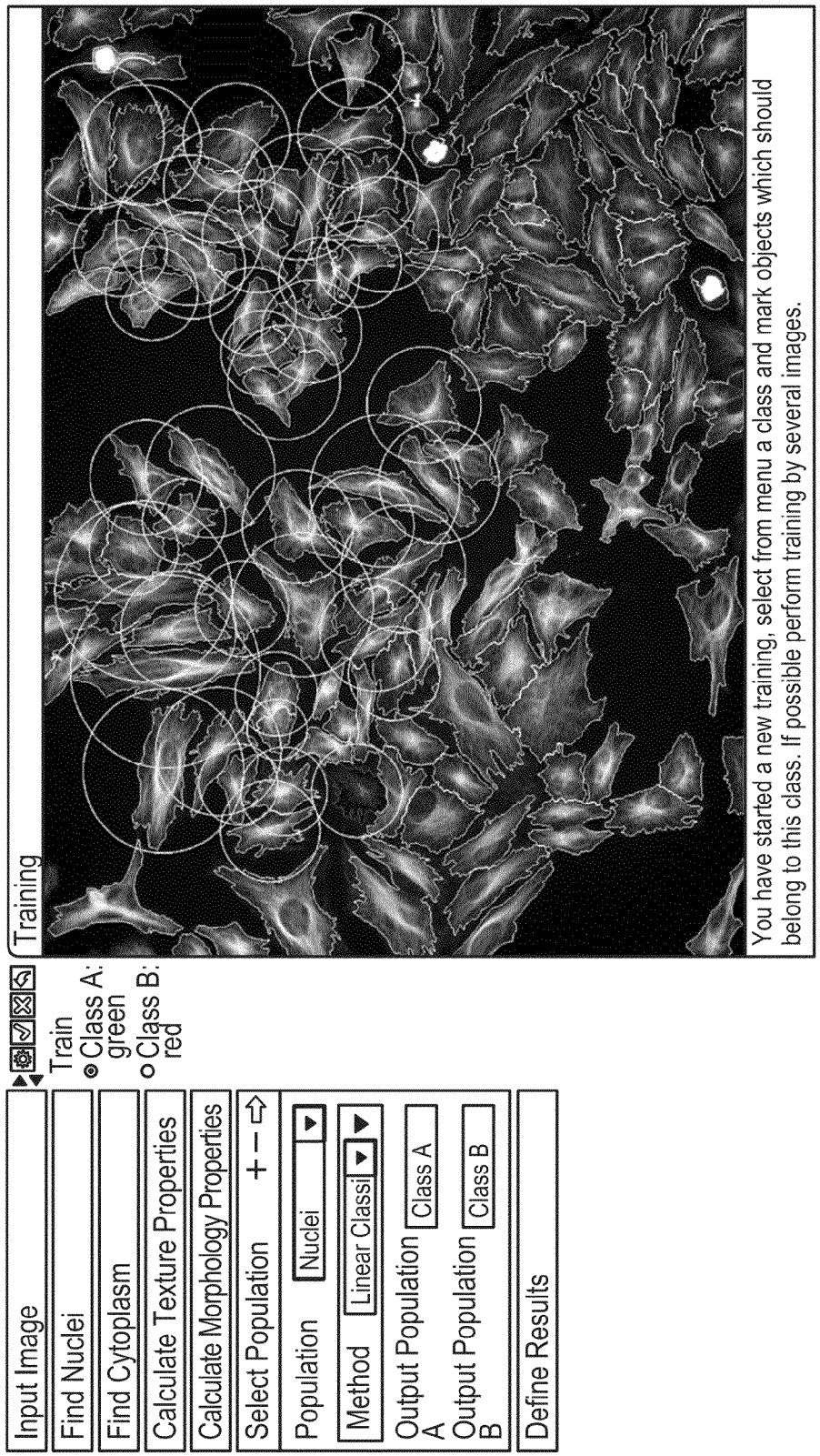
FIGS. 7 and 8 are screenshots of the selection process of cells for a training set in which representatives of two classes of cells are selected for use in determining relevant features and parameters of classification, according to an illustrative embodiment of the invention.
Figure 8:
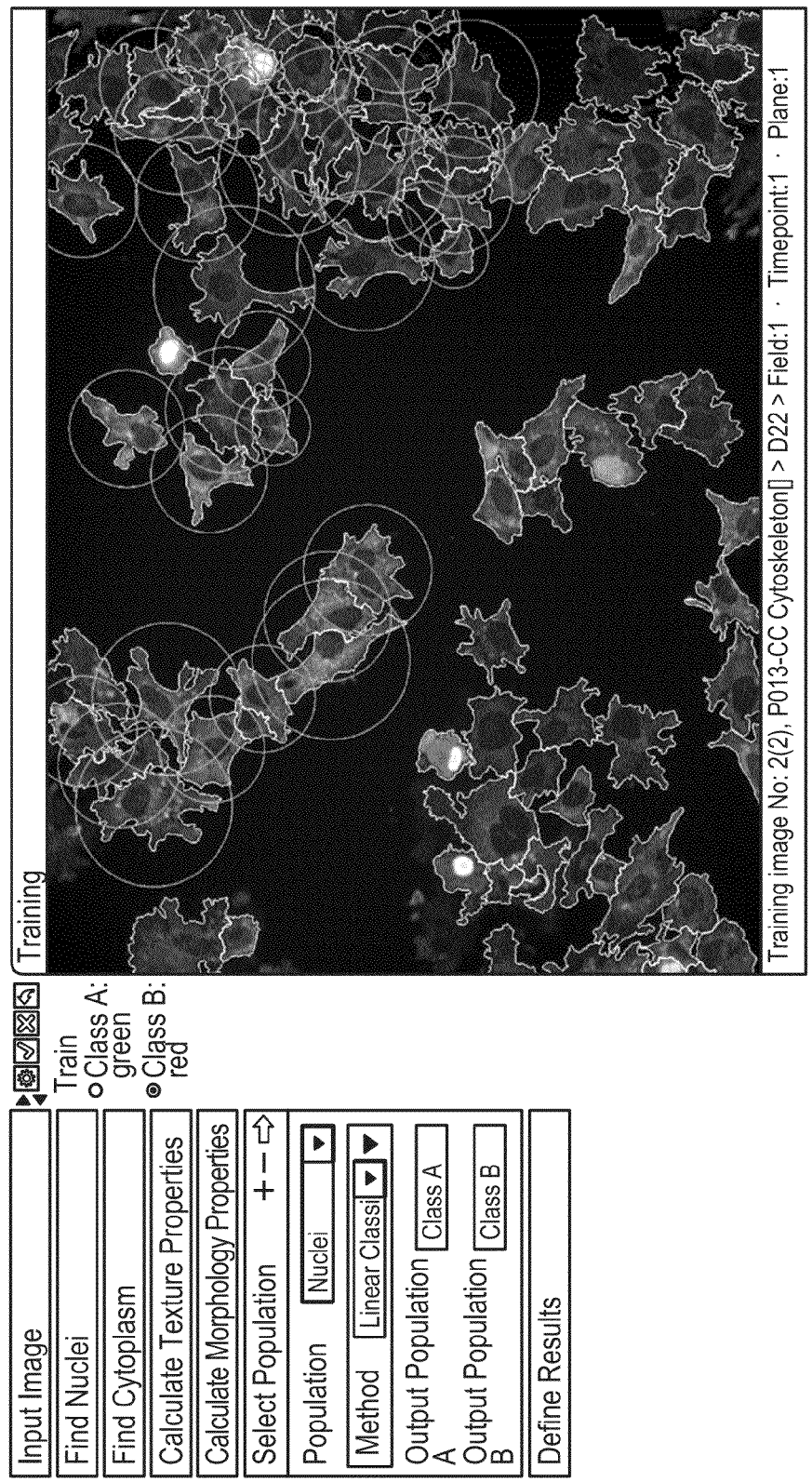

As the next step, a new building block Select Population is added, and a linear classifier method is selected. The software code then guides a user to the training mode in which the system identifies the most significant pairs of features and determines parameters (i.e. linear coefficients) for classification. The training stage begins with instructions in which the user creates a training set of cells. Using an input device, such as a mouse or keyboard, the user identifies cells that belong to each class. In the depicted embodiment, cells of one class (class A) are selected from a sample (well D13) shown in FIG. 7, and cells of another class (class B) are selected from another sample (well D22) shown in FIG. 8. In other examples (not shown), cells of different classes are selected from the same image (the same well).

In certain embodiments, the training mode is a stage in which the user inputs instructions. The user selects representatives of class 1 and class 2 (or more classes if there are more). When representatives of all classes have been selected, the computer identifies relevant features and calculates linear coefficients for classification. Together, these two stages or steps are called training.

When instructions are completed, or when the user wants to see the outcome of classification, the user may push or click "accept and exit training." At this point, the software code directs the computer or processor to pre-select potentially relevant features. For example, out of 187 features, fourteen features may be automatically identified at this stage. Next, the computer enters the stage of fine-selection of features by selecting four relevant features of these fourteen for use in classification. Next, parameters of classification (e.g., linear coefficients for the four selected features and an offset) are determined which completes preparations for classification of cells.

In certain embodiments, the systems, methods, and apparatus described herein are used to determine optimum groups of features for discriminating between three or more classifications (i.e., not just two). For example, with three classes, a two-class classifier may be applied for all three pairs of classes. With more than three classes, the number of class pairs is greater than three, with each pair of classes presenting a set of features. In one embodiment, during the step of pre-selecting features, preselected features from each class pair may be combined to form a single reservoir of pre-selected features (common for all class pairs).

The systems, methods, and apparatus described herein have applications in many different scientific fields and industries. Classification is a general field in mathematics and has applications in a wide spectrum of sciences (from physics to social sciences). As described above, these techniques may be used to classify cell phenotype. In certain embodiments, the techniques are used to detect gender from photographs. For example, after extracting a high number of features from photos and selecting a training set with a known gender, most relevant features may be selected using the approach described here. In another embodiment, the techniques are used to make investment decisions. In this case, after extracting a high number of features (e.g., of securities and security markets) that may be relevant in investment decisions and selecting a training set (e.g., using historical data and known measures of success), the most relevant features can be determined using the approach described here. In yet another embodiment, the techniques are used to predict earthquakes. In this application, after extracting a high number of features that are relevant for predicting earthquakes, and selecting a training set (using historical data with known earthquake times and magnitudes), the most relevant features can be determined using the approach described here.

When the methods, systems, and apparatus described herein are used for cell classification, various intensity, texture, and morphology features may be considered. While there are no universally accepted feature sets for classification of cells, examples of cell features that may be calculated or considered for this task include: a morphological feature, a geometrical feature, a Zernike moment feature, a Haralick texture feature, an edge feature, a wavelet feature, a region property, a cellular adjacency feature, a clustering feature, a phenotype shape descriptor, a kinetic measurement, and a subcellular location feature (e.g., distance from an organelle to a nucleus). Additional features useful for classification of cells are described in the following references, which are hereby incorporated by reference herein in their entireties: X. Chen, M. Velliste, R. F. Murphy, Automated Interpretation of Subcellular Patterns in Fluorescence Microscopy Images for Location Proteomics, Cytometry Part A 69A: 631-640 (2006); N. A. Hamilton, R. S. Pantelic, K. Hanson, R. D. Teasdale, Fast Automated Cell Phenotype Image Classification, BMC Bioinformatics 8: 110 (2007); L.-H. Loo, L. F. Wu, S. J. Altschuler, Image-Based Multivariate Profiling of Drug Responses from Single Cells, Nature Methods 4(5): 445-453 (2007); J. Wang, X. Zhou, P. L. Bradley, S.-F. Chang, N. Perrimon, S. T. C. Wong, Cellular Phenotype Recognition for High-Content RNA Interference Genome-Wide Screening, J Biomolecular Screening 13(1): 29-39 (2008); V. Ljosa, A. E. Carpenter, Introduction to the Quantitative Analysis of Two-Dimensional Fluorescence Microscopy Images for Cell-Based Screening, PLoS Computational Biology, 5(12): e1000603 (2009); and M. Held, M. H. A. Schmitz, B. Fischer, T. Walter, B. Neumann, M. H. Olma, M. Peter, J. Ellenberg, D. W. Gerlich, CellCognition: Time-Resolved Phenotype Annotation in High-Throughput Live Cell Imaging, Nature Methods 7(9): 747-754 (2010).

It should be noted that embodiments of the present invention may be provided as one or more computer-readable programs embodied on or in one or more articles of manufacture. The article of manufacture may be any suitable hardware apparatus, such as, for example, a floppy disk, a hard disk, a CD ROM, a CD-RW, a CD-R, a DVD ROM, a DVD-RW, a DVD-R, a flash memory card, a PROM, a RAM, a ROM, or a magnetic tape. In general, the computer-readable programs may be implemented in any programming language. Some examples of languages that may be used include C, C++, or JAVA. The software programs may be further translated into machine language or virtual machine instructions and stored in a program file in that form. The program file may then be stored on or in one or more of the articles of manufacture.

A computer hardware apparatus may be used in carrying out any of the methods described herein. The apparatus may include, for example, a general purpose computer, an embedded computer, a laptop or desktop computer, or any other type of computer that is capable of running software, issuing suitable control commands, receiving graphical user input, and recording information. The computer typically includes one or more central processing units for executing the instructions contained in software code that embraces one or more of the methods described herein. The software may include one or more modules recorded on machine-readable media, where the term machine-readable media encompasses software, hardwired logic, firmware, object code, and the like. Additionally, communication buses and I/O ports may be provided to link any or all of the hardware components together and permit communication with other computers and computer networks, including the internet, as desired. The computer may include a memory or register for storing data.

In certain embodiments, the modules described herein may be software code or portions of software code. For example, a module may be a single subroutine, more than one subroutine, and/or portions of one or more subroutines. The module may also reside on more than one machine or computer. In certain embodiments, a module defines data by creating the data, receiving the data, and/or providing the data. The module may reside on a local computer, or may be accessed via network, such as the Internet. Modules may overlap—for example, one module may contain code that is part of another module, or is a subset of another module.

The computer can be a general purpose computer, such as a commercially available personal computer that includes a CPU, one or more memories, one or more storage media, one or more output devices, such as a display, and one or more input devices, such as a keyboard. The computer operates using any commercially available operating system, such as any version of the Windows™ operating systems from Microsoft Corporation of Redmond, Wash., or the Linux™ operating system from Red Hat Software of Research Triangle Park, N.C. The computer is programmed with software including commands that, when operating, direct the computer in the performance of the methods of the invention. Those of skill in the programming arts will recognize that some or all of the commands can be provided in the form of software, in the form of programmable hardware such as flash memory, ROM, or programmable gate arrays (PGAs), in the form of hard-wired circuitry, or in some combination of two or more of software, programmed hardware, or hard-wired circuitry. Commands that control the operation of a computer are often grouped into units that perform a particular action, such as receiving information, processing information or data, and providing information to a user. Such a unit can include any number of instructions, from a single command, such as a single machine language instruction, to a plurality of commands, such as a plurality of lines of code written in a higher level programming language such as C++. Such units of commands are referred to generally as modules, whether the commands include software, programmed hardware, hard-wired circuitry, or a combination thereof. The computer and/or the software includes modules that accept input from input devices, that provide output signals to output devices, and that maintain the orderly operation of the computer. The computer also includes at least one module that renders images and text on the display. In alternative embodiments, the computer is a laptop computer, a minicomputer, a mainframe computer, an embedded computer, or a handheld computer. The memory is any conventional memory such as, but not limited to, semiconductor memory, optical memory, or magnetic memory. The storage medium is any conventional machine-readable storage medium such as, but not limited to, floppy disk, hard disk, CD-ROM, and/or magnetic tape. The display is any conventional display such as, but not limited to, a video monitor, a printer, a speaker, an alphanumeric display. The input device is any conventional input device such as, but not limited to, a keyboard, a mouse, a touch screen, a microphone, and/or a remote control. The computer can be a stand-alone computer or interconnected with at least one other computer by way of a network. This may be an Internet connection.

As used herein, an "image"—for example, an image of one or more cells—includes any visual representation, such as a photo, a video frame, streaming video, as well as any electronic, digital or mathematical analogue of a photo, video frame, or streaming video. Any apparatus described herein, in certain embodiments, includes a display for displaying an image or any other result produced by the processor. Any method described herein, in certain embodiments, includes a step of displaying an image or any other result produced via the method.

Example

Figure 9:
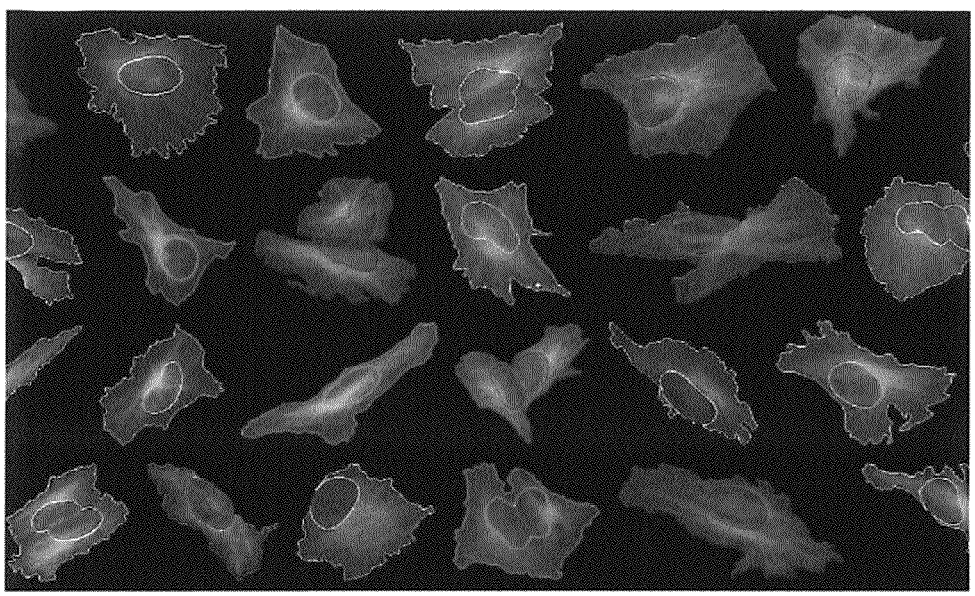
FIG. 9 is an image of selected cells of class A (native cells), according to an illustrative embodiment of the invention.
Figure 10:
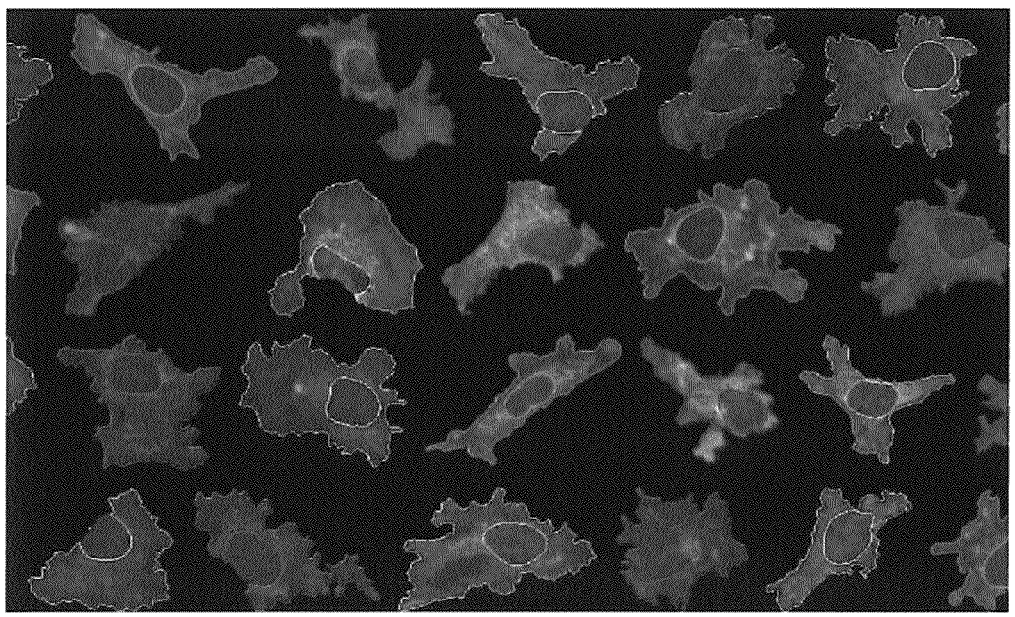
FIG. 10 is an image of selected cells of class B (treated cells), according to an illustrative embodiment of the invention.

FIGS. 9 and 10 depict images of native cells and treated cells (i.e., cells that have been treated with a biochemically active compound), respectively, in accordance with one illustrative example of the present invention. Comparing the cells in these two figures, it is seen that the two different types of cells differ in appearance. For example, the treated cells include edges or boundaries that are more irregular than the edges of the native cells. In addition, while the native cells are textured by lines with preferred radial orientation, the treated cells have spots rather than lines. The radial distribution of intensity is also different for the two classes of cells.

To classify these cells, the goal was to identify a set of relevant features that were best suited for distinguishing the two populations. In this case, 187 intensity, texture, and morphology features were calculated for both sets of cells.

Figure 11:
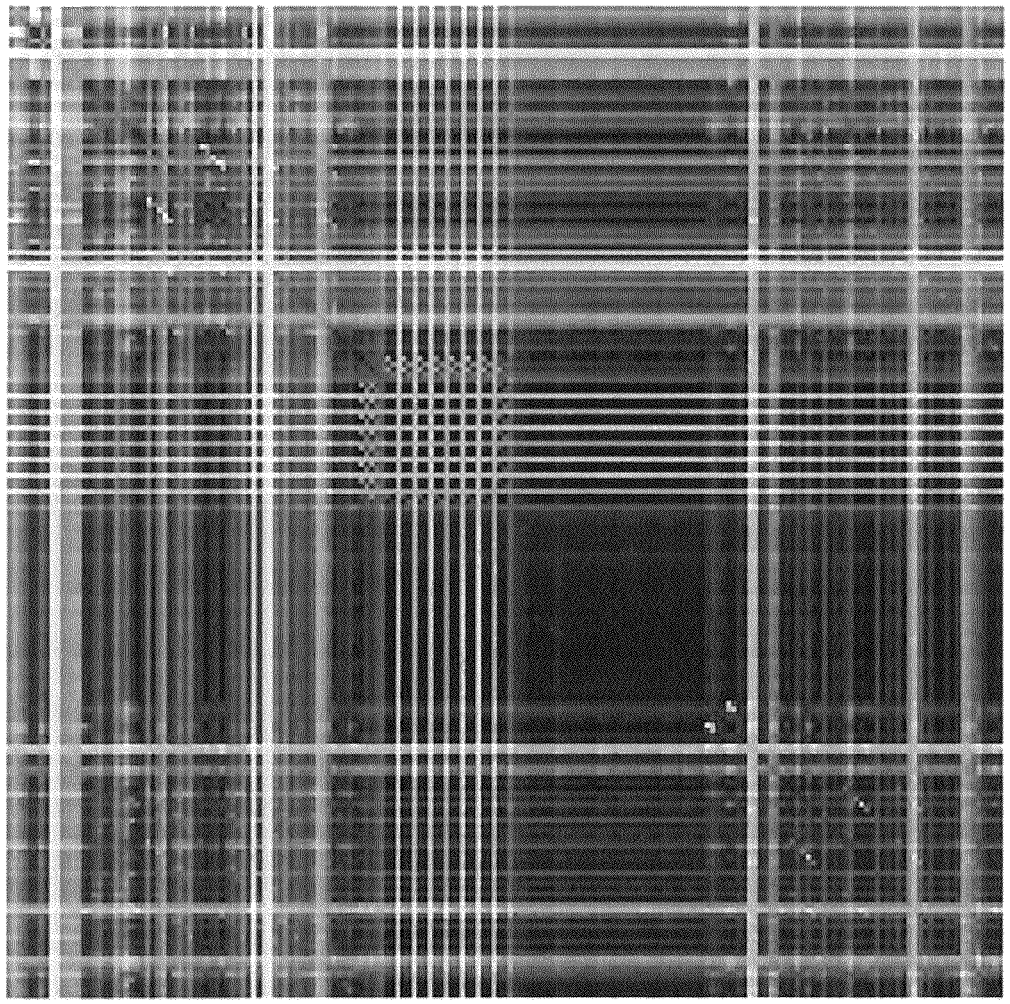
FIG. 11 is an image of a matrix of signal-to-noise ratio (S/N) values for all pairs of features, according to an illustrative embodiment of the invention.
Figure 12:
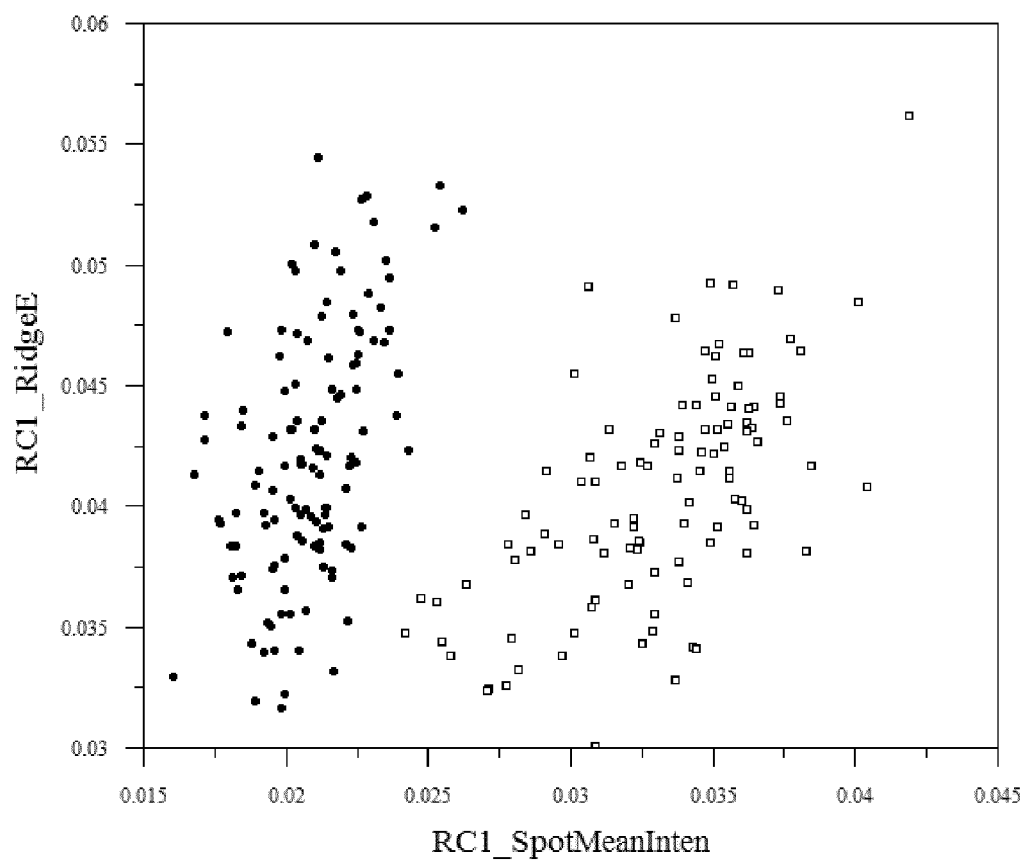
FIG. 12 is a plot of a best pair of features for distinguishing two classes of cells, according to an illustrative embodiment of the invention.

FIG. 11 depicts an image of a 187×187 matrix in which each row and each column represents one of these features, and each element in the matrix represents a pair of features. The value of each element of the matrix is represented by a pixel in the image, and each pixel has an intensity corresponding to the S/N of the best projection on the plane of the corresponding pair of features. In one embodiment, the plane of features (i,j) is simply the plane with the x-coordinate being feature i and the y-coordinate being feature j. The intensity value of element i,j corresponds to the S/N for the pair of features having index values (i,j). Because pair i,j is the same as pair j,i, the matrix is naturally symmetrical. As depicted, the maximum S/N value in this example (i.e., S/N=2.68) occurred at the pair of index values (8,40). This means that the two features having index values 8 and 40 were the best pair in this example. In FIG. 12, cells from training images are plotted on the plane of the best pair of features. Each black circle in this figure represents a native cell, and each square represents a treated cell. The x-axis represents feature "RC1_SpotMeanInten," which is a texture feature quantifying mean intensity of a spot-filtered image normalized by the original image. The y-axis represents feature "RC1_RidgeE," which is a combined texture-morphology feature characterizing intensity of a ridge-filtered image in an outer region of cytoplasm.

The next step was to pick a selected number of feature pairs with the highest values of S/N. In this case, $N_P$ was 16 and $N_S$ was 4.

Next, a list of features appearing at least once among the selected pair of features was compiled to obtain a pre-selected list of features. In this example, the pre-selected list of features included $N_1$=14 features, obtained with $N_P$=16, and $N_S$=4. Specifically, with 16 pairs of features, five features appeared only once, three features appeared two times, three features appeared three times, and three features appeared four times. Thus, there were 14 unique features among 16 selected pairs of features. Other features were ignored in subsequent steps. In this example, the calculation time of pre-selection of features was 0.25 seconds, using a Dell Latitude 630 (2.2 GHz laptop). This time does not include the time required to calculate 187 features of 228 cells, which was a couple of seconds.

Next, beginning with the best pair of features, the best third partner to add to the existing list of features was identified. In this example, the best third partner was at index 10, among the 14 features. With three features, S/N increased from 2.68 to 3.29, which is significant.

Next, attempts were made to expand the list even further. By including the index values (0, 1, 10, and 2), the S/N increased to 3.51. Further expansion of the list did not increase S/N significantly. Therefore, attempts were then made to contract the list, and the list was reduced by one feature (with index 1).

Figure 13:
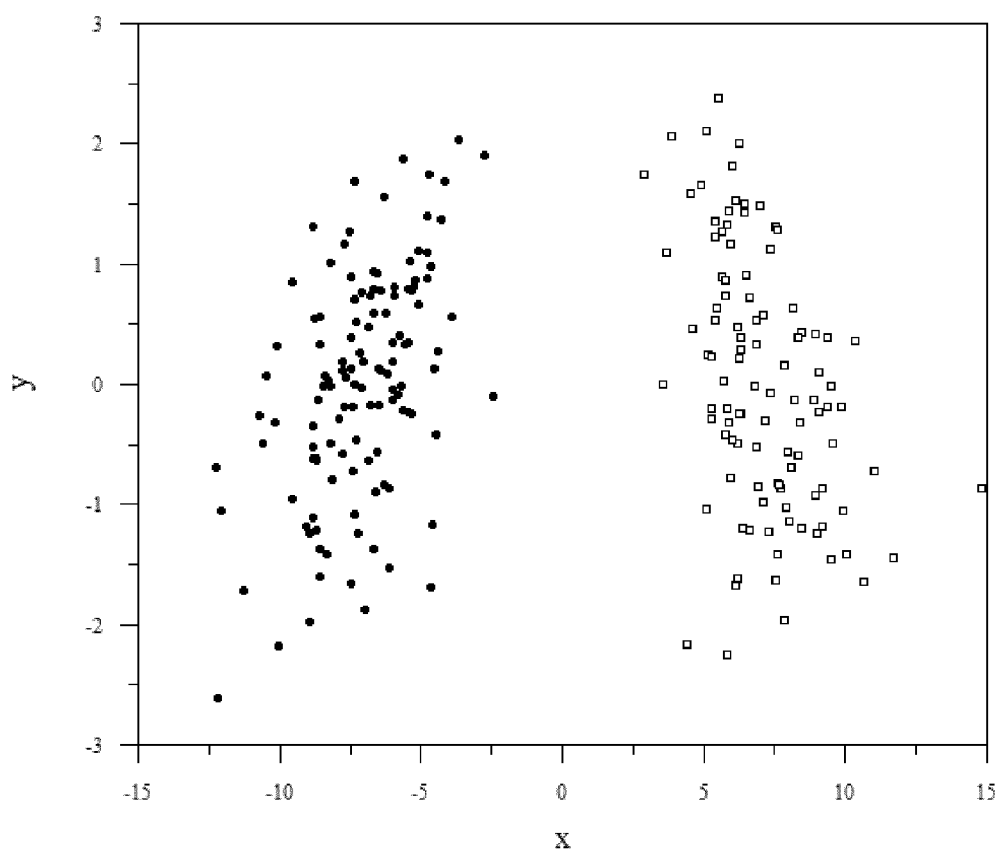
FIG. 13 is a plot of a projection in a space of four significant features, according to an illustrative embodiment of the invention.

After repeated attempts of expansion and, if expansion was not successful, contraction, the best set of features was obtained, having index values (0, 10, 2, 12) and S/N=3.74. The calculation time associated with the fine-selection of features just described was 0.4 seconds. FIG. 13 is a plot of the best projection (x-axis) in the space of the four significant features, together with another neutral projection (y-axis, for illustrative purposes only) selected from the plane of two first principal components.

Other input parameters of the pre-selection procedure have also been tested. For example, when selecting $N_P$=40 and $N_S$=6, the final result in this example remained the same. In a majority of all other examples studied, the result was substantially independent of the input parameters $N_P$ and $N_S$. Even in the rare cases when a dependence was detected, the difference in terms of S/N was small. In certain embodiments, it is preferable to avoid very small values of N. For example, it may be preferable to set $N_P$ equal to at least eight.

In certain embodiments, to select appropriate values of $N_P$ and $N_S$, the goal is to achieve substantially the same S/N when $N_P$ and $N_S$ are further increased. When $N_P$ and $N_S$ are determined in this manner, relevant features will not be missed during the pre-selection stage. However, when $N_P$ is reduced below a critical limit, the result may get worse.

Certain embodiments of the present invention were described above. It is, however, expressly noted that the present invention is not limited to those embodiments, but rather the intention is that additions and modifications to what was expressly described herein are also included within the scope of the invention. Moreover, it is to be understood that the features of the various embodiments described herein were not mutually exclusive and can exist in various combinations and permutations, even if such combinations or permutations were not made express herein, without departing from the spirit and scope of the invention. In fact, variations, modifications, and other implementations of what was described herein will occur to those of ordinary skill in the art without departing from the spirit and the scope of the invention. As such, the invention is not to be defined only by the preceding illustrative description.

What is claimed is:

1. An apparatus for automated selection of features of cells useful for classifying cell phenotype, said features extracted from one or more images of the cells, the apparatus comprising:
   (a) a memory for storing a code defining a set of instructions; and
   (b) a processor for executing the set of instructions,
wherein the code comprises an automated feature selection module to identify a set $S_2$ of $N_2$ calculated features for classification of cell phenotype, wherein the automated image feature selection module is configured to:
   (i) determine a signal-to-noise ratio for each of a plurality of pairs of features from an original set $S_0$ of $N_0$ calculated features of cells in one or more images, wherein the signal-to-noise ratio of a given pair of features reflects an ability to use that pair of features to classify cell phenotype, and identify a predetermined number $N_P$ of feature pairs from the original set $S_0$ of $N_0$ calculated features, said $N_P$ pairs having the highest signal-to-noise ratio, wherein $N_P$ is an integer$\geq 2$; and
   (ii) identify the set $S_2$ of $N_2$ calculated features for classification of cell phenotype from among the members of the $N_p$ pairs of calculated features.

2. The apparatus of claim 1, wherein $N_0$ is an integer from about 100 to about 1000, and wherein $N_2$ is an integer no greater than about 10.

3. The apparatus of claim 2, wherein $N_2$ is an integer from 2 to 6.

4. The apparatus of claim 1, wherein the automated image feature selection module is configured to identify, in step (ii), a set $S_1$ of all features from which the set $S_2$ of $N_2$ features for classification of cell phenotype is selected, wherein the set $S_1$ contains all distinct (non-redundant) members of the $N_P$ feature pairs except pairs that contain a given feature that has appeared in more than a predetermined number $N_s$ of pairs with higher signal-to-noise ratio.

5. The apparatus of claim 4, wherein $N_P$ is an integer between 10 and 30, and $N_s$ is an integer between 2 and 6.

6. The apparatus of claim 4, wherein the automated image feature selection module is further configured to:
   (iii) populate candidate set $S_2'$ with the feature pair having the highest signal-to-noise ratio from among the $N_P$ feature pairs, then proceed to step (iv);
   (iv) for each candidate feature remaining in set $S_1$, that is not already in set $S_2'$, determine a signal-to-noise ratio for the set of all members of set $S_2'$ together with the candidate feature of set $S_1$, determine which one of these candidate features of set $S_1$ provides the highest signal-to-noise ratio when grouped with the members of set $S_2'$, accept this candidate feature of set $S_1$ into set $S_2'$ and repeat step (iv) with the updated set $S_2'$ where addition of the candidate feature of set $S_1$ into set $S_2'$ increases signal-to-noise ratio by at least a first threshold amount, and reject addition of the candidate feature of set $S_1$ into set $S_2'$ and proceed to step (v) if addition of the candidate feature of set $S_1$ into set $S_2'$ does not increase signal-to-noise ratio of set $S_2'$ by at least the first threshold amount;
   (v) for each possible pair of candidate features remaining in set $S_1$ that are not already in set $S_2'$, determine a signal-to-noise ratio for the set of all members of set $S_2'$ together with the pair of candidate features from set $S_1$, determine which one of these pairs of candidate features of set $S_1$ provides the highest signal-to-noise ratio when grouped with the members of set $S_2'$, accept this pair of candidate features of set $S_1$ into set $S_2'$ and repeat step (iv) with the updated set $S_2'$ where addition of the pair of candidate features of set $S_1$ into set $S_2'$ increases signal-to-noise ratio by at least a second threshold amount, and reject addition of the pair of candidate features of set $S_1$ into set $S_2'$ and proceed to step (vi) if addition of the candidate pair of features of set $S_1$ into set $S_2'$ does not increase signal-to-noise ratio by at least the second threshold amount; and
   (vi) for each given member of set $S_2'$, determine a signal-to-noise ratio for the set of all the members of set $S_2'$ except the given member, determine which one of the given members results in the highest signal-to-noise ratio of the set $S_2'$ with the given member removed from set $S_2'$, remove this given member from set $S_2'$ and repeat step (iv) with the updated set $S_2'$ where removal of this given member from set $S_2'$ increases signal-to-noise ratio of set $S_2'$ by at least a third threshold amount, and retain this given member in set $S_2'$ and accept members of candidate set $S_2'$ into set $S_2$ where removal of this given member from set $S_2'$ does not increase signal-to-noise ratio of set $S_2'$ by at least the third threshold amount.

7. The apparatus of claim 6, wherein the magnitude of the third threshold amount is the same as the magnitude of the first threshold amount, and the magnitude of the second threshold amount is twice the magnitude of the first threshold amount.

8. The apparatus of claim 1, wherein the code further comprises an automated classification module configured to classify cell phenotype of one or more selected cells, wherein the automated classification module is configured to:
   (vii) for each of the one or more selected cells, quantify each member of the set $S_2$ of image features; and
   (viii) for each of the one or more selected cells, identify a cell phenotype for that cell based on the values of the $S_2$ image features for that cell, quantified in step (vii).

9. The apparatus of claim 8, wherein the automated classification module is configured to, for each of the one or more selected cells, identify the cell phenotype for that cell, wherein the cell phenotype is one class selected from two possible classes.

10. The apparatus of claim 8, wherein the automated classification module is configured to, for each of the one or more selected cells, identify the cell phenotype for that cell, wherein the cell phenotype is one class selected from three or more possible classes.

11. The apparatus of claim 1, wherein the features of cells for which signal-to-noise ratios are determined in step (i) by the automated image feature selection module comprise texture features, morphology features, intensity features, or any combination thereof.

12. The apparatus of claim 11, wherein the features of cells for which signal-to-noise ratios are determined in step (i) by the automated image feature selection module comprise one or more members selected from the group consisting of: a morphological feature, a geometrical feature, a Zernike moment feature, a Haralick texture feature, an edge feature, a wavelet feature, a region property, a cellular adjacency feature, a clustering feature, a phenotype shape descriptor, a kinetic measurement, and a subcellular location feature (e.g., distance from an organelle to a nucleus).

13. The apparatus of claim 1, wherein the automated image feature selection module is configured to determine a signal-to-noise ratio for each possible pairwise combination of features among the $N_0$ calculated features.

14. The apparatus of claim 13, wherein the automated image feature selection module is configured to directly calculate in step (i) an $N_0 \times N_0$ matrix of linear coefficients, W, for maximizing an objective function, wherein the elements $W_{i,j}$ of matrix W are measures of signal-to-noise ratio for corresponding feature pairs (i,j) and are calculated using an analytical solution for inversion of a 2×2 symmetric matrix.

15. The apparatus of claim 14, wherein the objective function is a ratio of variance between two classes to variance within the two classes.

16. The apparatus of claim 1, wherein the one or more images are 2D images.

17. The apparatus of claim 1, wherein the one or more images are 3D images.

18. A method for automated selection of image features useful for classifying cell phenotype, the method comprising the steps of:
(a) quantifying each of a plurality of features for a first set of imaged cells obtained from a subject and having a first known class;
(b) quantifying each of the plurality of features for a second set of imaged cells obtained from a subject and having a second known class different from the first known class;
(c) using values of the features quantified in steps (a) and (b) for the first and second sets of imaged cells, determining for each of a plurality of selected pairs of features a signal-to-noise ratio for discrimination between the first and second classes on the basis of the selected pair of features;
(d) identifying a predetermined number $N_p$ of feature pairs with highest signal-to-noise ratio determined in step (c) wherein $N_p$ is an integer≥2; and
(e) identifying a set $S_1$ of all features within the $N_p$ feature pairs identified in step (d) from which the set $S_2$ of image features for classification of cell phenotype of an unknown sample is selected.

19. The method of claim 18, wherein step (e) comprises selecting set $S_2$ by:
(i) populating candidate set $S_2'$ with the feature pair having the highest signal-to-noise ratio from among the $N_P$ feature pairs, then proceeding to step (ii);
(ii) for each candidate feature remaining in set $S_1$, that is not already in set $S_2'$, determining a signal-to-noise ratio for the set of all members of set $S_2'$ together with the candidate feature of set $S_1$, determining which one of these candidate features of set $S_1$ provides the highest signal-to-noise ratio when grouped with the members of set $S_2'$, accept this candidate feature of set $S_1$ into set $S_2'$ and repeating step (ii) with the updated set $S_2'$ where addition of the candidate feature of set $S_1$ into set $S_2'$ increases signal-to-noise ratio by at least a first threshold amount, and rejecting addition of the candidate feature of set $S_1$ into set $S_2'$ and proceeding to step (iii) if addition of the candidate feature of set $S_1$ into set $S_2'$ does not increase signal-to-noise ratio of set $S_2'$ by at least the first threshold amount;

(iii) for each possible pair of candidate features remaining in set $S_1$ that are not already in set $S_2'$, determining a signal-to-noise ratio for the set of all members of set $S_2'$ together with the pair of candidate features from set $S_1$, determining which one of these pairs of candidate features of set $S_1$ provides the highest signal-to-noise ratio when grouped with the members of set $S_2'$, accepting this pair of candidate features of set $S_1$ into set $S_2'$ and repeating step (ii) with the updated set $S_2'$ where addition of the pair of candidate features of set $S_1$ into set $S_2'$ increases signal-to-noise ratio by at least a second threshold amount, and rejecting addition of the pair of candidate features of set $S_1$ into set $S_2'$ and proceeding to step (iv) if addition of the candidate pair of features of set $S_1$ into set $S_2'$ does not increase signal-to-noise ratio by at least the second threshold amount; and
(iv) for each given member of set $S_2'$, determining a signal-to-noise ratio for the set of all the members of set $S_2'$ except the given member, determining which one of the given members results in the highest signal-to-noise ratio of the set $S_2'$ with the given member removed from set $S_2'$, removing this given member from set $S_2'$ and repeating step (ii) with the updated set $S_2'$ where removal of this given member from set $S_2'$ increases signal-to-noise ratio of set $S_2'$ by at least a third threshold amount, and retaining this given member in set $S_2'$ and accepting members of candidate set $S_2'$ into set $S_2$ where removal of this given member from set $S_2'$ does not increase signal-to-noise ratio of set $S_2'$ by at least the third threshold amount.

20. The method of claim 19, wherein the magnitude of the third threshold amount is the same as the magnitude of the first threshold amount, and the magnitude of the second threshold amount is twice the magnitude of the first threshold amount.

21. The method of claim 18, further comprising determining a signal-to-noise ratio for each of a plurality of pairs of features from an original set $S_0$ of $N_0$ calculated features of cells in one or more images, wherein the signal-to-noise ratio of a given pair of features reflects an ability to use that pair of features to classify cell phenotype, wherein $N_0$ is an integer from about 100 to about 1000, and further comprising identifying the set $S_2$ of $N_2$ calculated features for classification of cell phenotype from among the members of the $N_p$ pairs of calculated features, wherein $N_2$ is an integer no greater than about 10.

22. The method of claim 18, wherein $N_2$ is an integer from 2 to 6.

23. The method of claim 18, wherein $N_P$ is an integer between 10 and 30.

24. The method of claim 18, wherein the set $S_1$ contains all distinct (non-redundant) members of the $N_p$ feature pairs except pairs that contain a given feature that has appeared in more than a predetermined number $N_s$ of pairs with higher signal-to-noise ratio.

25. The method of claim 24, wherein $N_s$ is an integer between 2 and 6.

26. The method of claim 18, comprising the step of classifying cell phenotype of one or more selected cells by:
(I) for each of the one or more selected cells, quantifying each member of the set $S_2$ of image features; and
(II) for each of the one or more selected cells, identifying a cell phenotype for that cell based on the values of the $S_2$ image features for that cell.

27. The method of claim 26, comprising, for each of the one or more selected cells, identifying the cell phenotype for that cell, wherein the cell phenotype is one class selected from two possible classes.

28. The method of claim 26, comprising, for each of the one or more selected cells, identifying the cell phenotype for that cell, wherein the cell phenotype is one class selected from three or more possible classes.

29. The method of claim 18, wherein the features of cells for which signal-to-noise ratios are determined comprise texture features, morphology features, intensity features, or any combination thereof.

30. The method of claim 29, wherein the features of cells for which signal-to-noise ratios are determined comprise one or more members selected from the group consisting of: a morphological feature, a geometrical feature, a Zernike moment feature, a Haralick texture feature, an edge feature, a wavelet feature, a region property, a cellular adjacency feature, a clustering feature, a phenotype shape descriptor, a kinetic measurement, and a subcellular location feature (e.g., distance from an organelle to a nucleus).

31. The method of claim 18, comprising determining a signal-to-noise ratio for each possible pairwise combination of features among a plurality of pairs of features from an original set $S_0$ of $N_0$ calculated features of cells in one or more images, wherein the signal-to-noise ratio of a given pair of features reflects an ability to use that pair of features to classify cell phenotype.

32. The method of claim 31, comprising calculating an $N_0 \times N_0$ matrix of linear coefficients, W, for maximizing an objective function, wherein the elements $W_{i,j}$ of matrix W are measures of signal-to-noise ratio for corresponding feature pairs (i,j) and are calculated using an analytical solution for inversion of a 2×2 symmetric matrix.

33. The method of claim 32, wherein the objective function is a ratio of variance between two classes to variance within the two classes.

* * * * *